United States Patent
Sando et al.

(10) Patent No.: US 12,162,473 B2
(45) Date of Patent: Dec. 10, 2024

(54) DRIVING FORCE CONTROL METHOD AND DRIVING FORCE CONTROL DEVICE

(71) Applicant: Nissan Motor Co., Ltd., Yokohama (JP)

(72) Inventors: Katsuhiko Sando, Kanagawa (JP); Fumiaki Kobayashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/283,386

(22) PCT Filed: Mar. 22, 2021

(86) PCT No.: PCT/JP2021/011800
§ 371 (c)(1),
(2) Date: Sep. 21, 2023

(87) PCT Pub. No.: WO2022/201261
PCT Pub. Date: Sep. 29, 2022

(65) Prior Publication Data
US 2024/0166194 A1     May 23, 2024

(51) Int. Cl.
*B60W 30/02* (2012.01)
*B60W 20/15* (2016.01)
*B60W 30/18* (2012.01)

(52) U.S. Cl.
CPC .......... *B60W 30/025* (2013.01); *B60W 20/15* (2016.01); *B60W 30/18009* (2013.01)

(58) Field of Classification Search
CPC .............. B60W 30/025; B60W 20/15; B60W 30/18009
See application file for complete search history.

(56) References Cited

U.S. PATENT DOCUMENTS

| 11,752,879 | B2 * | 9/2023 | Kang | ................... | B60W 10/08 701/22 |
| 2008/0249689 | A1 * | 10/2008 | Matsumoto | ............. | F16F 15/02 701/36 |

(Continued)

FOREIGN PATENT DOCUMENTS

| JP | 2006-217712 A | 8/2006 |
| JP | 2007-071370 A | 3/2007 |

(Continued)

OTHER PUBLICATIONS

JP-2007161032—A translation (Year: 2007).*
JP-2009273275—A translation (Year: 2009).*

*Primary Examiner* — Kyle T Johnson
(74) *Attorney, Agent, or Firm* — Young Basile Hanlon & MacFarlane, P.C.

(57) ABSTRACT

A driving force control method controls driving force distribution to each of a first driving source connected to front wheels and a second driving source connected to rear wheels so that a pitch angle of a vehicle behaves as desired. The method includes setting a pitch rate during starting of the vehicle to a corrected pitch rate different from a predetermined basic pitch rate, wherein the basic pitch rate is determined according to basic driving force distribution for achieving desired vehicle characteristics of the vehicle, and the corrected pitch rate is determined so as to adjust a feeling of acceleration of an occupant of the vehicle according to a change in a requested acceleration of the vehicle.

10 Claims, 14 Drawing Sheets

(56) References Cited

U.S. PATENT DOCUMENTS

| | | | | |
|---|---|---|---|---|
| 2012/0062375 A1* | 3/2012 | Takeuchi | ............. | B60W 50/14 |
| | | | | 701/1 |
| 2013/0231838 A1* | 9/2013 | Shiozawa | ............... | B60L 3/102 |
| | | | | 701/32.9 |
| 2013/0261914 A1* | 10/2013 | Ingram | ............... | B60W 30/188 |
| | | | | 701/423 |
| 2014/0297116 A1* | 10/2014 | Anderson | ............... | H02K 29/08 |
| | | | | 701/37 |
| 2015/0032332 A1* | 1/2015 | Kikuchi | ............. | B60W 30/025 |
| | | | | 701/37 |
| 2016/0121883 A1* | 5/2016 | Mao | ...................... | B60W 30/02 |
| | | | | 180/65.265 |
| 2016/0129903 A1* | 5/2016 | Takahashi | ............. | B60W 10/08 |
| | | | | 903/910 |
| 2016/0272211 A1* | 9/2016 | Igarashi | ............. | B60W 30/025 |
| 2016/0375948 A1* | 12/2016 | Takenaka | ................ | B62D 9/02 |
| | | | | 280/5.506 |
| 2017/0101008 A1* | 4/2017 | Hirokami | ............... | B60K 28/10 |
| 2017/0101087 A1* | 4/2017 | Momose | ................ | B60W 40/11 |
| 2017/0361847 A1* | 12/2017 | Marutani | .......... | B60W 30/18118 |
| 2020/0317018 A1* | 10/2020 | Nong | ...................... | G05D 1/027 |
| 2020/0368629 A1* | 11/2020 | Moss | ...................... | A63H 17/21 |
| 2021/0394768 A1* | 12/2021 | Kim | ................ | B60W 30/18145 |
| 2022/0105809 A1* | 4/2022 | Yamamoto | .......... | B60W 10/188 |
| 2022/0242449 A1* | 8/2022 | Sakayori | ........... | B60W 60/0013 |
| 2023/0382395 A1* | 11/2023 | Makita | .................. | B60W 40/08 |
| 2024/0166194 A1* | 5/2024 | Sando | ................ | B60W 30/025 |

FOREIGN PATENT DOCUMENTS

| | | | | |
|---|---|---|---|---|
| JP | 2007161032 A | * | 6/2007 | .......... B60G 17/016 |
| JP | 2009273275 A | * | 11/2009 | |
| JP | 2011-006015 A | | 1/2011 | |
| JP | 2012-061944 A | | 3/2012 | |
| JP | 2018-170854 A | | 11/2018 | |
| JP | 2021-003906 A | | 1/2021 | |

* cited by examiner

DRIVING FORCE CONTROL METHOD AND DRIVING FORCE CONTROL DEVICE

TECHNICAL FIELD

The present invention relates to a driving force control method and a driving force control device.

BACKGROUND ART

In JP2007-118898A, proposed is a braking/driving force control device that detects a pitch rate (pitch angular velocity) and applies different braking/driving forces to front and rear wheels so as to reduce the detected pitch rate. The pitch rate corresponds to a change in a pitch angle around a center of gravity, which corresponds to a change in a posture of a vehicle, when the vehicle passes over a step on a road surface.

SUMMARY OF INVENTION

In a control configuration of JP2007-118898A, when a road surface step or the like that causes a change in a posture of a vehicle is detected, a braking/driving force that suppresses the pitch rate is applied regardless of the magnitude of a longitudinal acceleration requested for the vehicle (hereinafter also referred to as "requested acceleration"). For this reason, an actual driving force of the vehicle may be smaller than the driving force appropriate for the requested acceleration from the viewpoint of achieving ideal vehicle characteristics (electricity consumption or fuel consumption characteristics, power characteristics, slip characteristics, and the like). As a result, since the actual driving force is insufficient with respect to the requested acceleration, a feeling of acceleration that an occupant in the vehicle has decreases, which may give the occupant a sense of discomfort.

Accordingly, an object of the present invention is to provide a driving force control method and a driving force control device that suppress an excessive or deficient feeling of acceleration of an occupant when starting a vehicle.

According to an aspect of the present invention, a driving force control method is provided. The driving force control method is for controlling driving force distribution to each of a first driving source connected to front wheels and a second driving source connected to rear wheels so that a pitch angle of a vehicle behaves as desired. The method includes setting a pitch rate during starting of the vehicle to a corrected pitch rate different from a predetermined basic pitch rate. In the method, the basic pitch rate is determined according to basic driving force distribution for achieving desired vehicle characteristics of the vehicle, and the corrected pitch rate is determined so as to adjust a feeling of acceleration of an occupant of the vehicle according to a change in a requested acceleration of the vehicle.

DESCRIPTION OF EMBODIMENTS

Hereinafter, embodiments of the present invention will be described in detail with reference to drawings.

First Embodiment

Hereinafter, the first embodiment will be described.

Figure 1:
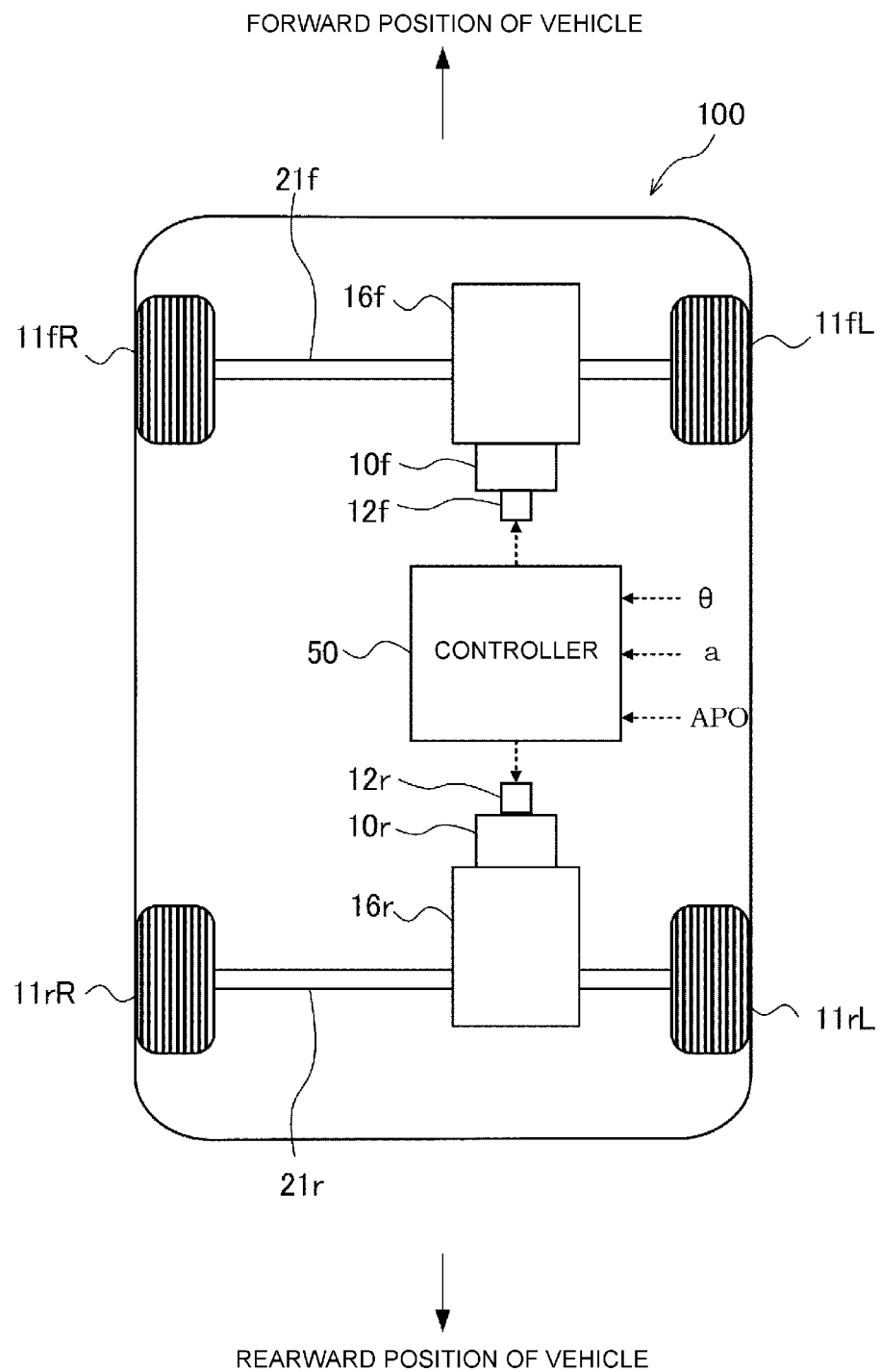
FIG. 1 is a diagram illustrating a configuration of a vehicle in which a driving force control method according to an embodiment of the present invention is executed.

FIG. 1 is a diagram illustrating a configuration of a vehicle 100 in which a driving force control method according to the present embodiment is executed.

Note that as the vehicle 100 in the present embodiment, an electric vehicle, a hybrid vehicle, or the like, which includes a drive motor 10 serving as a driving source and can travel by a driving force of the drive motor 10, is assumed.

The drive motor 10 includes a front wheel motor $10f$ serving as a first electric motor that drives front wheels $11f$ and provided at a forward position (hereinafter, referred to as a "front wheel side") of the vehicle 100, and a rear wheel motor $10r$ serving as a second electric motor that drives rear wheels $11r$ and provided at a rearward position (hereinafter, referred to as a "rear wheel side").

The front wheel motor $10f$ is implemented by a three-phase AC motor. The front wheel motor $10f$ generates a driving force by being supplied with power from a battery serving as a power source. The driving force generated by the front wheel motor $10f$ is transmitted to the front wheels $11f$ via a front wheel transmission $16f$ and a front wheel drive shaft $21f$. The front wheel motor $10f$ converts, into alternating-current power, a regenerative driving force generated when the front wheel motor $10f$ rotates together with the front wheels $11f$ during traveling of the vehicle 100. Note that the power supplied to the front wheel motor $10f$ is adjusted by a front wheel inverter $12f$. Especially, the front wheel inverter $12f$ drives the front wheel motor $10f$ with a driving force (hereinafter also referred to as "front wheel driving force $F_f$") based on a total driving force requested for the vehicle 100 (hereinafter also referred to as "total requested driving force $F_{fr}$") and a distribution ratio determined for the front wheel motor $10f$.

On the other hand, the rear wheel motor 10r is implemented by a three-phase AC motor. The rear wheel motor 10r generates a driving force by being supplied with the power from the battery serving as a power source. The driving force generated by the rear wheel motor 10r is transmitted to the rear wheels 11r via a rear wheel transmission 16r and a rear wheel drive shaft 21r. The rear wheel motor 10r converts, into alternating-current power, a regenerative driving force generated when the rear motor 10r rotates together with the rear wheels 11r during traveling of the vehicle 100. Note that the power supplied to the rear wheel motor 10r is adjusted by a rear wheel inverter 12r. Especially, the rear wheel inverter 12r drives the rear wheel motor 10r with a driving force (hereinafter also referred to as "rear wheel driving force $F_r$") based on the total requested driving force $F_{fr}$ and a distribution ratio κ determined for the rear wheel motor 10r.

Furthermore, the vehicle 100 is provided with a controller 50 serving as a driving force control device that controls driving force distribution (that is, the front wheel driving force $F_f$ and the rear wheel driving force $F_r$) of the vehicle 100 based on various input information.

The controller 50 is implemented by a computer including a central processing unit (CPU), a read-only memory (ROM), a random access memory (RAM), and an input/output interface (I/O interface), and is programmed to execute processes in vehicle control to be described below. In particular, a function of the controller 50 can be implemented by any of in-vehicle computers such as a vehicle control module (VCM), a vehicle motion controller (VMC), and a motor controller, and/or a computer provided outside the vehicle 100. The controller 50 may be implemented by one piece of computer hardware, or may be implemented by distributing various processes by a plurality of pieces of computer hardware.

Furthermore, the various input information (estimated value or detected value) input to the controller 50 includes an operation amount for an accelerator pedal mounted on the vehicle 100 (hereinafter also referred to as "accelerator opening APO"), a pitch angle θ, and an acceleration in a longitudinal direction of the vehicle 100 (hereinafter also referred to as "longitudinal acceleration a"). The input information may include a steering angle of the vehicle 100, a gradient angle of a traveling path of the vehicle 100, a friction (road surface μ) of the traveling path of the vehicle 100, and/or a state of charge (SOC), which is a parameter suggesting a remaining amount of charge of the battery mounted on the vehicle 100.

Note that the accelerator opening APO in the present embodiment is a parameter representing a value of the longitudinal acceleration a requested for the vehicle 100. On the other hand, when the vehicle 100 is equipped with a so-called automatic driving function and at least a requested acceleration $a_{fr}$ is determined by a predetermined automatic driving controller (an "Advanced Driver Assistance Systems (ADAS)" controller or an "Autonomous Driving (AD)" controller), the value of the requested longitudinal acceleration a is determined based on a commanded driving force. Therefore, hereinafter, the accelerator opening APO is collectively expressed as "requested acceleration $a_{fr}$".

Functions of the controller 50 are described in more detail below.

Figure 2:
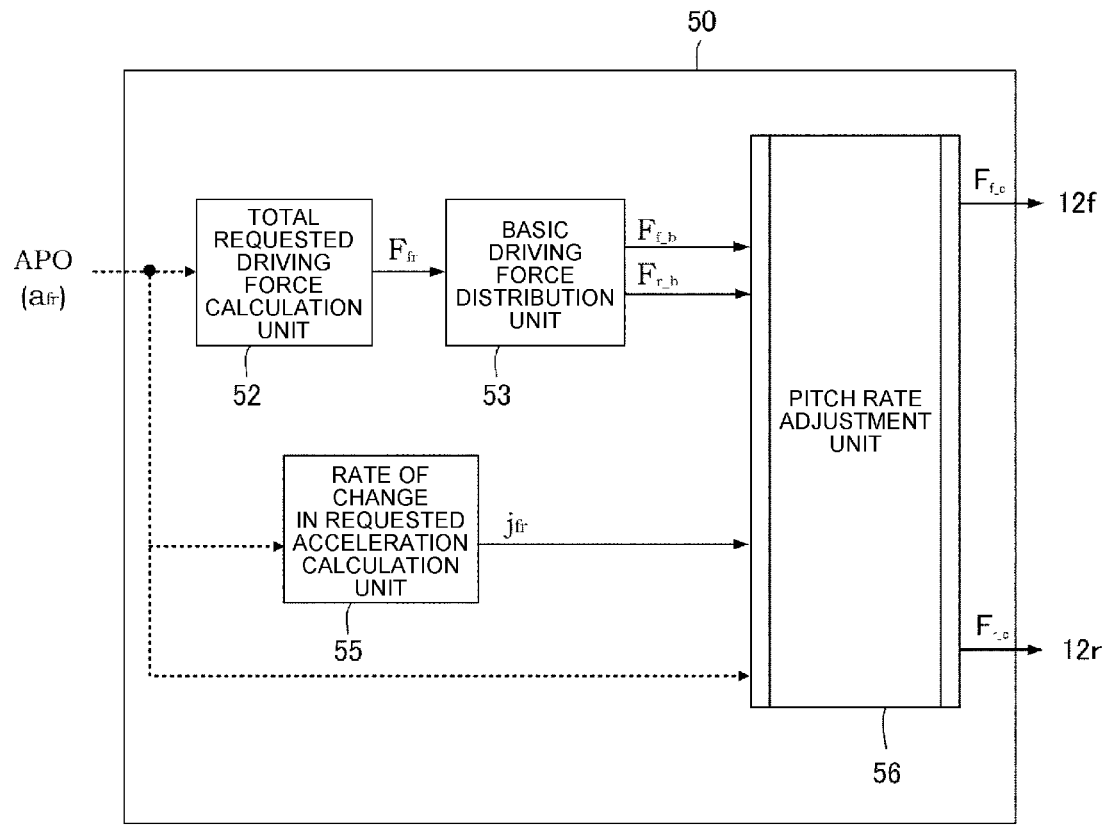
FIG. 2 is a block diagram illustrating a functional configuration of a driving force control device that executes the driving force control method.

FIG. 2 is a block diagram illustrating a configuration of the controller 50. As illustrated in the drawing, the controller 50 includes a total requested driving force calculation unit 52, a basic driving force distribution unit 53, a rate of change in requested acceleration calculation unit 55, and a pitch rate adjustment unit 56.

The total requested driving force calculation unit 52 receives the accelerator opening APO and other parameters such as a vehicle speed as appropriate, and calculates the total requested driving force $F_{fr}$, which is the sum of the driving force requested for the vehicle 100. For example, the total requested driving force calculation unit 52 calculates the total requested driving force $F_{fr}$ by reading from any memory a predetermined map that defines an appropriate total requested driving force $F_{fr}$ in accordance to the accelerator opening APO and the vehicle speed, and then applying the received accelerator opening APO and the vehicle speed to the map. Then, the total requested driving force calculation unit 52 outputs the calculated total requested driving force $F_{fr}$ to the basic driving force distribution unit 53.

The basic driving force distribution unit 53 receives the total requested driving force $F_{fr}$ from the total requested driving force calculation unit 52, and calculates a basic value of the front wheel driving force $F_f$ (hereinafter also referred to as "basic front wheel driving force $F_{f\_b}$") and a basic value of the rear wheel driving force $F_r$ (hereinafter also referred to as "basic rear wheel driving force $F_{r\_b}$") from a predetermined basic distribution ratio $κ_b$. Here, the basic distribution ratio $κ_b$ is a basic value of the distribution ratio κ determined by experiments or simulations so as to achieve desired vehicle characteristics of the vehicle 100. Note that the term vehicle characteristics used in the present embodiment mainly includes characteristics related to an efficiency of energy consumed in operations such as travelling of the vehicle 100 (fuel consumption performance or electricity consumption performance), characteristics related to a difficulty of slipping in the front wheels 1 if or the rear wheels 11r (slip performance); followability of the longitudinal acceleration a with respect to the requested acceleration $a_{fr}$ (power performance), and the like.

A specific value related to the basic distribution ratio $κ_b$ can be changed as appropriate depending on specifications and driving scenes of the vehicle 100. As an example, from the viewpoint of achieving preferable vehicle characteristics, when traveling straight on a flat paved road at a constant speed, the basic distribution ratio $κ_b$ can be set to 50 (front wheels):50 (rear wheels) so that the front wheel driving force $F_f$ and the rear wheel driving force $F_r$ are the same value. Note that a basic value of the pitch angle θ of the vehicle 100 (hereinafter also referred to as "basic pitch angle $θ_b*$"), and a basic value of the pitch rate ω (hereinafter also referred to as "basic pitch rate $ω_b*$") is determined based on the basic distribution ratio $κ_b$, which is determined from the viewpoint of achieving the vehicle characteristics. Significances of the pitch angle θ and the pitch rate ω in the present embodiment will be explained.

Figure 3:
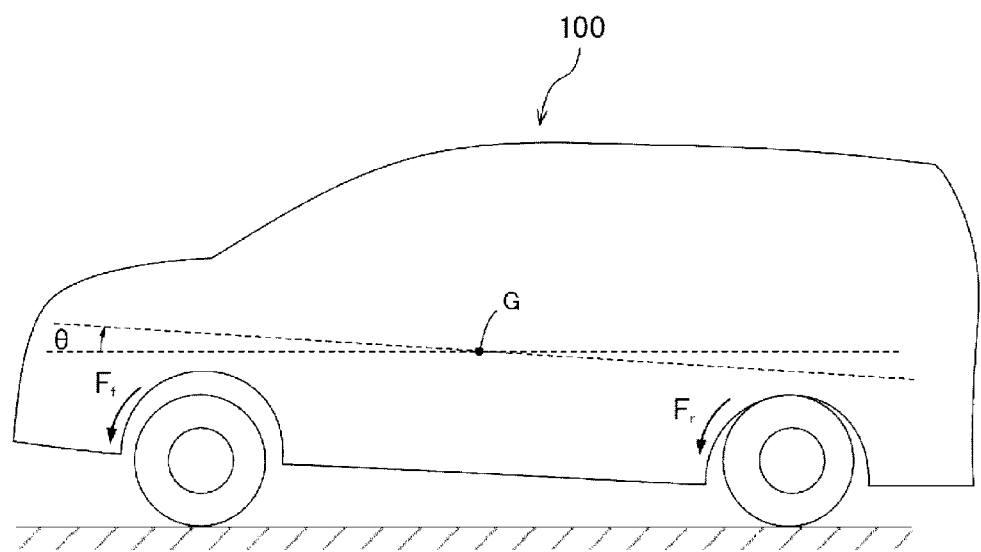
FIG. 3 is a diagram illustrating a pitch motion of the vehicle.

FIG. 3 is a diagram schematically illustrating a pitch motion of vehicle 100. As shown in the drawing, the pitch angle θ in the present embodiment is defined as displacement in a pitch direction (rotational direction about an axis passing through a center of gravity G and extending in a vehicle width direction) with respect to a horizontal direction around the center of gravity G of the vehicle 100. Especially, in the present embodiment, a sign of the pitch angle θ is set so that a direction in which the front wheels 11f of the vehicle 100 are lifted (nose-up direction) is positive, and a direction in which the rear wheels 11r are lifted (nose-down direction) is negative. Furthermore, the pitch rate ω is defined as a rate of change over time of this pitch angle θ (that is, a pitch angular velocity). Here, the pitch angle θ and the pitch rate ω change according to the distribution ratio κ of the driving force and various travelling environments (road surface unevenness, road surface gradient, and the like). In other words, the pitch angle θ and the pitch rate ω can be controlled by manipulating the respective magnitudes (driving force distribution) of the front wheel driving force $F_f$ and the rear wheel driving force $F_r$.

Returning to FIG. 2, the basic driving force distribution unit 53 outputs the calculated basic front wheel driving force $F_{f\_b}$ and the basic rear wheel driving force $F_{r\_b}$ to the pitch rate adjustment unit 56.

The rate of change in requested acceleration calculation unit 55 receives the requested acceleration $a_{fr}$ (accelerator opening APO) to calculate a rate of change in requested acceleration $j_{fr}$. Specifically, the rate of change in requested acceleration calculation unit 55 calculates an amount of change in the requested acceleration $a_{fr}$ per predetermined control period as the rate of change in requested acceleration $j_{fr}$. Then, the rate of change in requested acceleration calculation unit 55 outputs the calculated rate of change in requested acceleration $j_{fr}$ to the pitch rate adjustment unit 56.

The pitch rate adjustment unit 56 uses the longitudinal acceleration a, the requested acceleration $a_{fr}$, the rate of change in requested acceleration $j_{fr}$, the basic front wheel driving force $F_{f\_b}$, and the basic rear wheel driving force $F_{r\_b}$ as input information. Then, the pitch rate adjustment unit 56 calculates a corrected front wheel driving force $F_{f\_c}$ and a corrected rear wheel driving force $F_{r\_c}$ to be set under predetermined conditions to be described later during starting of the vehicle 100, based on the requested acceleration $a_{fr}$ and the rate of change in requested acceleration $j_{fr}$. Especially, the pitch rate adjustment unit 56 executes adjustment processing I to III that defines a corrected pitch rate $\omega_{\_c}^*$, which will be described later.

Then, the pitch rate adjustment unit 56 calculates the front wheel driving force $F_f$ and the rear wheel driving force $F_r$ when the pitch rate ω is matched with the corrected pitch rate $\omega_{\_c}^*$ obtained by the adjustment processing, as the corrected front wheel driving force $F_{f\_c}$ and the corrected rear wheel driving force $F_{r\_c}$, respectively.

Especially, the pitch rate adjustment unit 56 calculates the corrected front wheel driving force $F_{f\_c}$ and the corrected rear wheel driving force $F_{r\_c}$ for approaching the pitch rate ω to the corrected pitch rate $\omega_{\_c}^*$ during starting of the vehicle 100. More specifically, when the pitch angle θ decreases (when nose down the vehicle 100), the pitch rate adjustment unit 56 calculates the corrected front wheel driving force $F_{f\_c}$ and the corrected rear wheel driving force $F_{r\_c}$ so that the corrected pitch rate $\omega_{\_c}^*$ becomes a negative value. More specifically, when an anti-dive angle φ of a front suspension of the vehicle 100 is negative (that is, when the front suspension has a downward shape toward the front wheels 1 if in a side view of the vehicle 100), by setting the corrected front wheel driving force $F_{f\_c}$ in a decreasing direction and/or the corrected rear wheel driving force $F_{r\_c}$ in an increasing direction, the corrected pitch rate $\omega_{\_c}^*$ becomes a negative value (nose down). On the other hand, when the pitch angle θ increases (when nose up the vehicle 100), the pitch rate adjustment unit 56 calculates the corrected front wheel driving force $F_{f\_c}$ and the corrected rear wheel driving force $F_{r\_c}$ so that the corrected pitch rate $\omega_{\_c}^*$ becomes a positive value. More specifically, when the anti-dive angle φ is negative, by setting the corrected front wheel driving force $F_{f\_c}$ in the increasing direction and/or the corrected rear wheel driving force $F_{r\_c}$ in the decreasing direction, the corrected pitch rate $\omega_{\_c}^*$ becomes a positive value (nose up).

Note that depending on a difference in a structure of the vehicle 100 (a difference between positive and negative anti-dive angles φ in particular), the increasing or decreasing direction of the corrected front wheel driving force $F_{f\_c}$ and/or the corrected rear wheel driving force $F_{r\_c}$ in accordance to the positive or negative of the corrected pitch rate $\omega_{\_c}^*$ to be set (the increasing or decreasing direction of the pitch angle θ) may be appropriately changed.

Then, under the predetermined conditions described later during starting of the vehicle 100, the pitch rate adjustment unit 56 outputs the corrected front wheel driving force $F_{f\_c}$ and the corrected rear wheel driving force $F_{r\_c}$ to the front wheel inverter 12f and the rear wheel inverter 12r, respectively. On the other hand, under conditions other than the above predetermined conditions, the pitch rate adjustment unit 56 outputs the basic front wheel driving force $F_f$b and the basic rear wheel driving force $F_{r\_b}$ to the front wheel inverter 12f and the rear wheel inverter 12r, respectively.

Further details of the adjustment processing I to III are described below. Note that the control described below assumes an acceleration scene (longitudinal acceleration a>0) during starting of the vehicle 100. However, the following control can also be applied to a deceleration scene (longitudinal acceleration a<0) with some modifications. Especially, in this case, in comparison of magnitude relation between the requested acceleration $a_{fr}$ and the rate of change in requested acceleration $j_{fr}$ and each threshold described later, it is preferable to use absolute values of the requested acceleration $a_{fr}$ and the rate of change in requested acceleration $j_{fr}$.

Figure 4A:
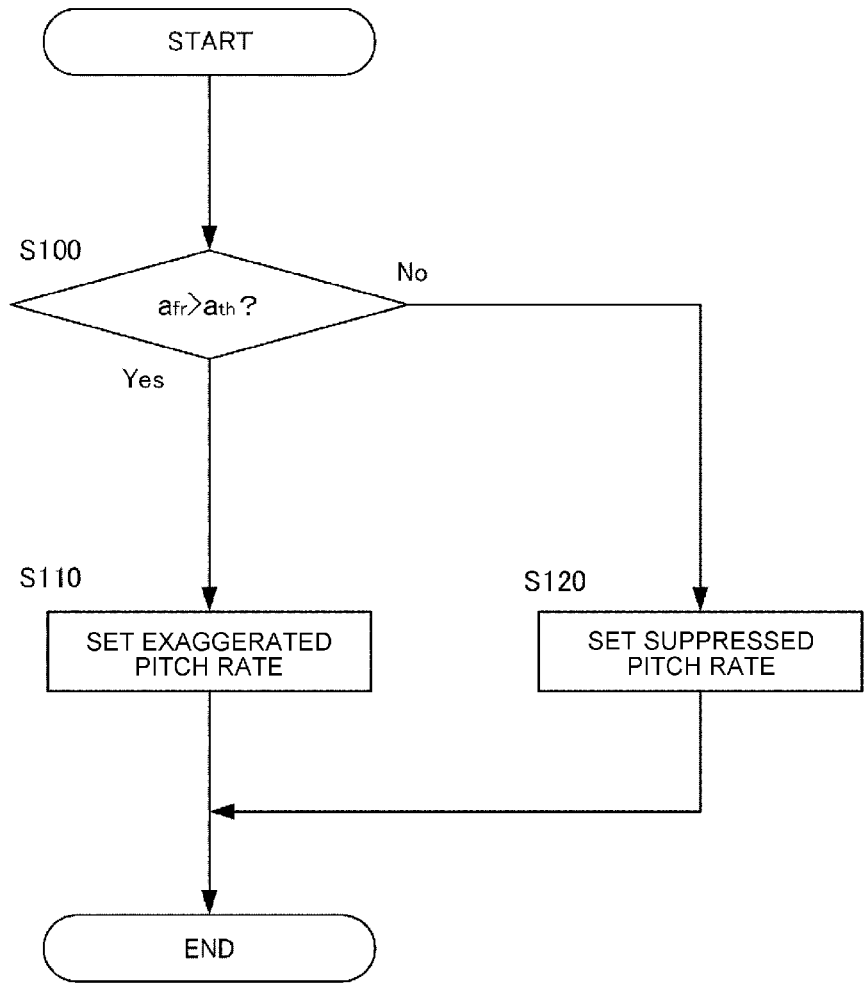
FIG. 4A is a flowchart explaining adjustment processing I.
Figure 4B:
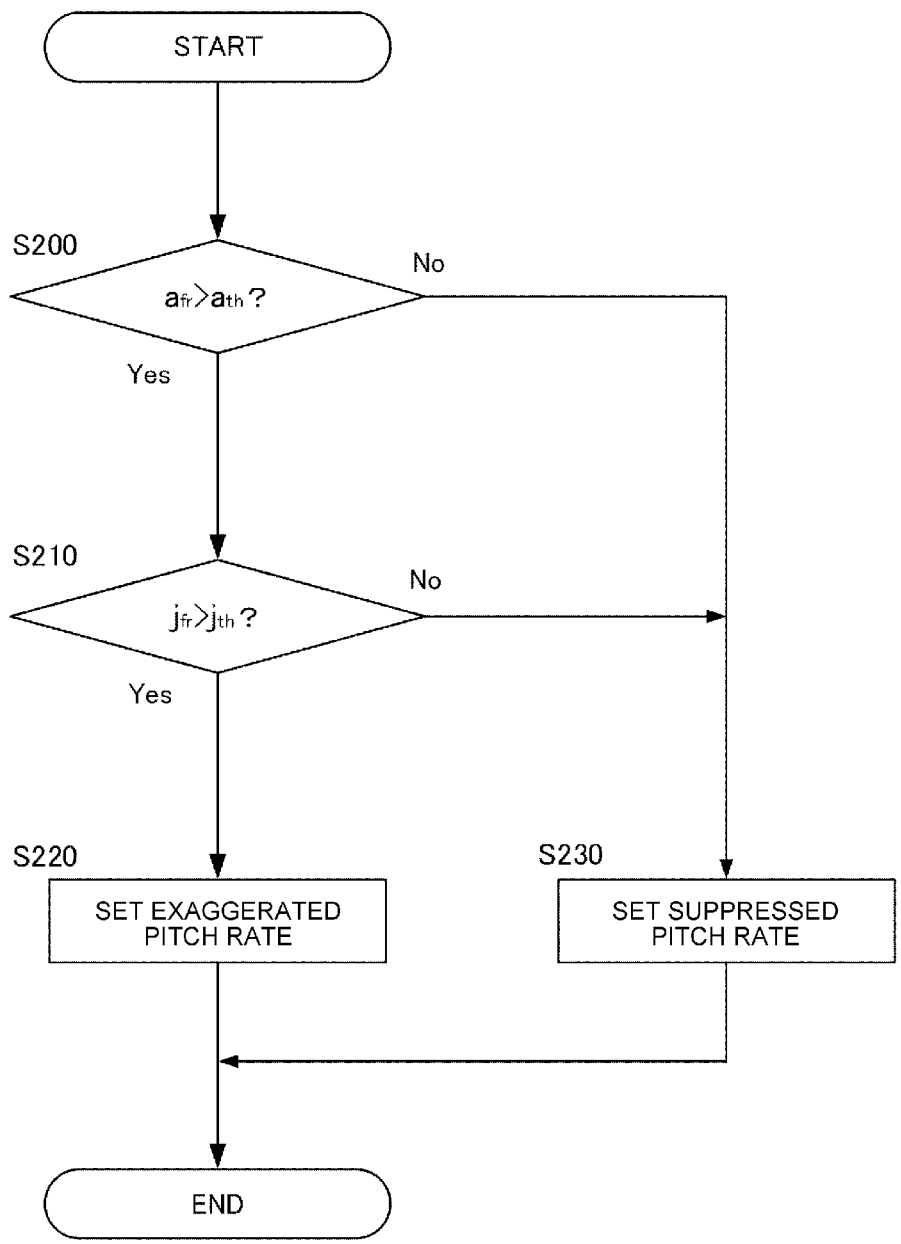
FIG. 4B is a flowchart explaining adjustment processing II.
Figure 4C:
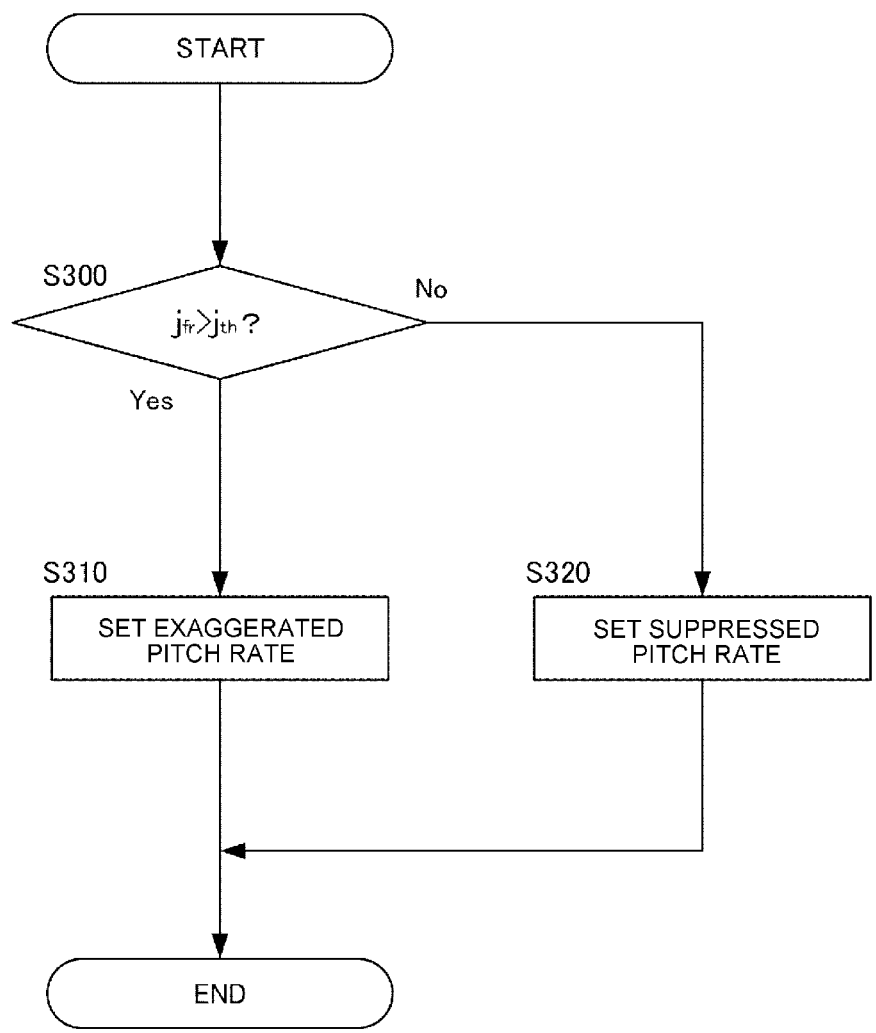
FIG. 4C is a flowchart explaining adjustment processing III.

In the pitch rate adjustment processing according to the present embodiment, one of the adjustment processing I, adjustment processing II, and adjustment processing III described below with reference to flowcharts of FIGS. 4A to 4C is selectively executed. Note that the controller 50 (particularly the pitch rate adjustment unit 56) repeatedly executes one of the routines shown in the flowcharts of FIGS. 4A to 4C at a predetermined calculation interval with a start time of the vehicle 100 as a base point.

(Adjustment Processing I)

FIG. 4A is a flowchart explaining the adjustment processing I. In the adjustment processing I, steps S100 to S120 are executed.

In step S100, the controller 50 determines whether the requested acceleration $a_{fr}$ exceeds a predetermined acceleration threshold $a_{th}$. Here, the acceleration threshold $a_{th}$ is determined from the viewpoint of determining whether the requested acceleration $a_{fr}$ is large enough to the extent that the occupant desires a feeling of acceleration above a certain level of the vehicle 100 (for example, whether the operation amount on the accelerator pedal by the driver is above a certain level). The acceleration threshold $a_{th}$ can be predetermined by experiments or simulations. Note that a specific value of the acceleration threshold $a_{th}$ can be changed variously and is not limited to a specified value, and can be set to about 0.2 G as an example.

In the present description, the feeling of acceleration of the occupant of the vehicle 100 means a subjective feeling of the occupant regarding an intensity of followability of the actual longitudinal acceleration a to the requested acceleration $a_{fr}$. That is, although criteria for the intensity of the feeling of acceleration largely depend on individual differences, the feeling of acceleration is at least related to the magnitude of the longitudinal acceleration a (magnitude of an inertial force acting on the occupant due to the longitudinal acceleration a). Therefore, as a result of diligent study, the present inventors focus on this point and come up with an idea of adjusting the level of the feeling of acceleration of the occupant by appropriately adjusting the rate of change of the pitch angle θ (that is, the pitch rate ω) during starting of the vehicle 100. Especially, by increasing the pitch rate ω so that the pitch angle θ increases at a desired speed, the vehicle 100 is pitch-displaced in the increasing direction of the pitch angle θ (nose-up direction). Therefore, an inertial force corresponding to the sum of the original longitudinal acceleration a and an additional pitch acceleration acts on the occupant. Therefore, by increasing the pitch rate ω, the feeling of acceleration of the occupant can be enhanced. On the other hand, by decreasing the pitch rate ω, the vehicle 100 is pitch-displaced in the decreasing direction of the pitch angle θ (nose-down direction). Therefore, an inertial force corresponding to an acceleration obtained by subtracting the pitch acceleration from the original longitudinal acceleration a acts on the occupant. Therefore, by increasing the pitch rate ω, the feeling of acceleration of the occupant can be weakened.

Therefore, the purpose of the determination in step S100 is to estimate whether or the occupant desires a strong feeling of acceleration above a certain level through the magnitude comparison between the requested acceleration $a_{fr}$ and the acceleration threshold $a_{th}$. More specifically, for example, when the occupant (particularly the driver) manually performs driving operation (accelerator operation) on the vehicle 100, it can be said that the magnitude of the requested acceleration $a_{fr}$ (accelerator opening APO) substantially directly reflects an acceleration intention of the driver. Therefore, in a situation where the requested acceleration $a_{fr}$ is large, it can be assumed that the situation is a scene in which the occupant of the vehicle 100 desires a strong feeling of acceleration above a certain level.

On the other hand, when the vehicle 100 is in automatic driving (when the driving operation is executed based on a command from the automatic driving controller), it cannot be said that the magnitude of the requested acceleration $a_{fr}$ directly reflects the acceleration intention. However, a situation in which the automatic driving controller sets a relatively large requested acceleration $a_{fr}$ often coincides with a situation in which the driver also recognizes that further acceleration is necessary (situation in which a distance between vehicles with respect to a vehicle ahead is large, a situation in which acceleration is performed for merging, or the like). Therefore, even when the vehicle 100 is in automatic driving, the determination in step S100 enables the detection of the scene in which the occupant desires a strong feeling of acceleration above a certain level with a certain degree of accuracy.

Next, if it is determined that the requested acceleration $a_{fr}$ exceeds the acceleration threshold $a_{th}$, the controller 50 sets the exaggerated pitch rate $\omega_{\_c1}*$ that is greater than the basic pitch rate $\omega_{\_b}*$ as the corrected pitch rate $\omega_{\_c}*$ (step S110). On the other hand, if it is determined that the requested acceleration $a_{fr}$ is equal to or lower than the acceleration threshold $a_{th}$, the controller 50 sets the suppressed pitch rate $\omega_{\_c2}*$ that is lower than the basic pitch rate $\omega_{\_b}*$ as the corrected pitch rate $\omega_{\_c}*$ (step S120).

Figure 5A:
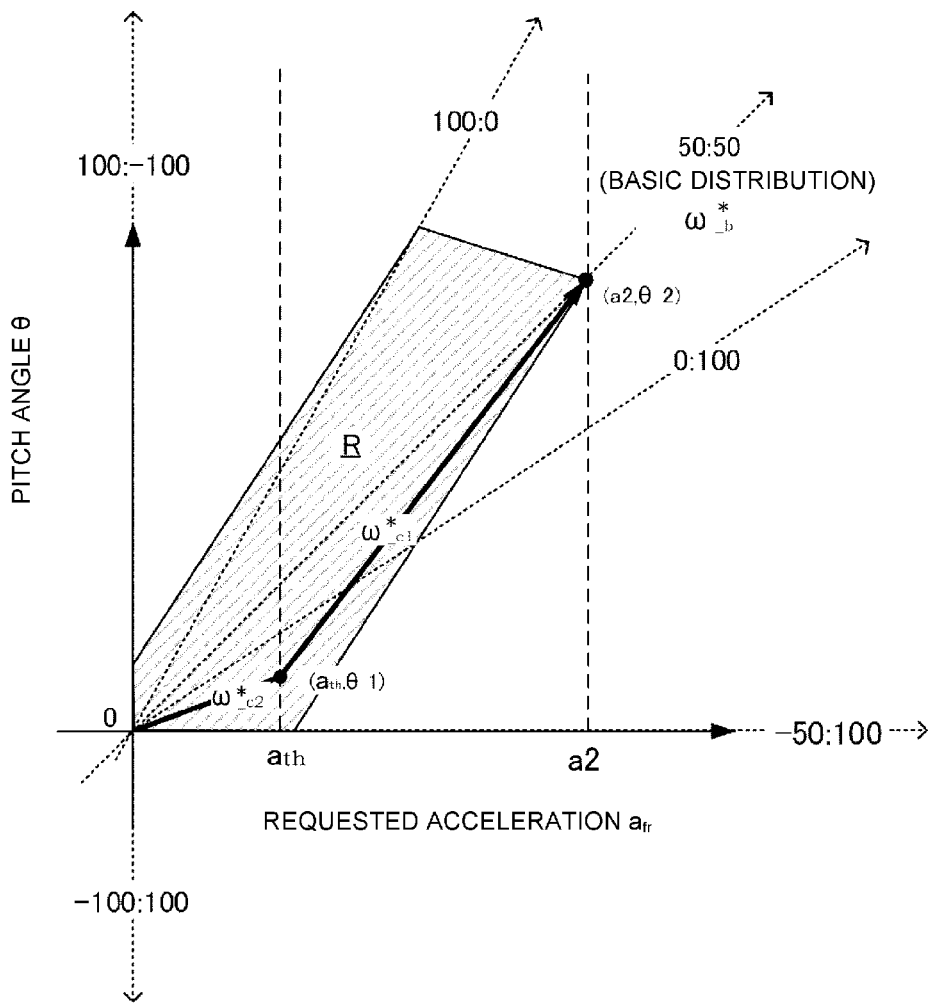
FIG. 5A is a map showing an example of operation points of a vehicle when a corrected pitch rate of the adjustment processing I is set.

FIG. 5A is a map showing an example of operation points (requested acceleration $a_{fr}$ and pitch angle θ) of the vehicle 100 when the corrected pitch rate $\omega_{\_c}*$ of the adjustment processing I is set. Note that a hatched portion in the drawing represents an entire range of the operation points that can be taken in the present embodiment (hereinafter also referred to as "feasible region R").

Note that in this map, a broken line represents a set of operation points determined according to each distribution ratio κ. That is, each broken line represents a set of operation points with a constant pitch rate ω determined according to each distribution ratio κ. Especially, in FIG. 5, a specific value of the distribution ratio κ (50:50, and the like) is described, but this is described to aid understanding, and is not intended to limit the configuration of the present embodiment.

As understood from FIG. 5A, in the feasible region R, the suppressed pitch rate $\omega_{\_c2}*$ lower than the basic pitch rate $\omega_{\_b}*$ is set in a region where the requested acceleration $a_{fr}$ is equal to or lower than the acceleration threshold $a_{th}$. On the other hand, in a region where the requested acceleration $a_{fr}$ exceeds the acceleration threshold $a_{th}$, the exaggerated pitch rate $\omega_{\_c1}*$ that is greater than the basic pitch rate $\omega_{\_b}*$ is set.

Note that the illustrated example is an example of straight lines representing the suppressed pitch rate $\omega_{\_c2}*$ and the exaggerated pitch rate $\omega_{\_c1}*$, and other forms of the suppressed pitch rate $\omega_{\_c2}*$ and the exaggerated pitch rate $\omega_{\_c1}*$ may be set within the scope of the control logic described in FIG. 4A. However, from the viewpoint of maintaining the power performance of the vehicle 100, the exaggerated pitch rate $\omega_{\_c1}*$ is preferably set so that the pitch angle θ at a maximum value $a_2$ of the requested acceleration $a_{fr}$ (for example, corresponding to the requested acceleration $a_{fr}$ when the accelerator is fully opened) becomes the same (value θ2 in FIG. 5A) as the basic pitch angle $\theta_{\_b}*$ based on the basic pitch rate $\omega_{\_b}*$.

By setting the corrected pitch rate $\omega_{\_c}*$ in this way, in a low acceleration region where the requested acceleration $a_{fr}$ is equal to or lower than the acceleration threshold $a_{th}$, the pitch rate ω is smaller than when the basic pitch rate $\omega_{\_b}*$ is set. As a result, the pitch displacement of the vehicle 100 is reduced in the low acceleration region, so that smooth acceleration with reduced pitch vibration is achieved. On the other hand, in a high acceleration region where the requested acceleration $a_{fr}$ exceeds the acceleration threshold $a_{th}$, the pitch rate ω is greater than when the basic pitch rate $\omega_{\_b}*$ is set. As a result, in the high acceleration region where it is estimated that the driver desires a strong feeling of acceleration, the pitch displacement of vehicle 100 (particularly displacement in the nose-up direction) can be increased to enhance the feeling of acceleration given to the driver. Especially, the exaggerated pitch rate $\omega_{\_c1}*$ is preferably set to a larger value as the requested acceleration $a_{fr}$ increases. As a result, it is possible to increase a pitch force in the nose-up direction that causes the feeling of acceleration in accordance to the intensity of the feeling of acceleration that is presumed to be desired by the driver.

Furthermore, as in the example shown in FIG. 5A, it is preferable to set the suppressed pitch rate $\omega_{\_c2}*$ so that the front wheel driving force $F_f$ is negative and the rear wheel driving force $F_r$ is positive (so as to have a slope smaller than a line with a distribution ratio κ of 0:100), and to set the exaggerated pitch rate $\omega_{\_c1}*$ so that the front wheel driving force $F_f$ and the rear wheel driving force $F_r$ are positive (so as to have especially a slope between a line with the basic distribution ratio of 50:50 and a line with a distribution ratio of 100:0). As a result, while achieving smooth acceleration with the pitch displacement reduced as described above, by keeping a section in which the directions of the front wheel driving force $F_f$ and the rear wheel driving force $F_r$ are different from each other below the acceleration threshold $a_{th}$, deterioration of electricity consumption is also suppressed.

(Adjustment Processing II)

FIG. 4B is a flowchart explaining the adjustment processing II. In the adjustment processing II, steps S200 to S230 are executed.

In step S200, the controller 50 determines whether the requested acceleration $a_{fr}$ exceeds the acceleration threshold $a_{th}$ as in step S100.

If it is determined that the requested acceleration $a_{fr}$ is equal to or lower than the acceleration threshold $a_{th}$, the controller 50 sets the suppressed pitch rate $\omega_{\_c2}*$ as the corrected pitch rate $\omega_{\_c}*$ as in the adjustment processing I (step S230). On the other hand, if it is determined that the requested acceleration $a_{fr}$ exceeds the acceleration threshold $a_{th}$, the controller 50 proceeds to step S210.

In step S210, the controller 50 determines whether the rate of change in requested acceleration $j_{fr}$ exceeds a predetermined rate-of-change threshold jt.

Here, the rate-of-change threshold $j_{th}$ is determined from the viewpoint of determining whether the change in the requested acceleration $a_{fr}$ is large enough to the extent that the occupant desires a feeling of acceleration above a certain level of the vehicle 100. The rate-of-change threshold $j_{th}$ can be predetermined by experiments or simulations. Especially, in the case where the driver manually drives the vehicle 100, when the rate of change in requested acceleration $j_{fr}$ is greater than a certain level, it can be said that this is a scene in which the driver performs a sudden accelerator operation. Therefore, when the rate of change in requested acceleration $j_{fr}$ is greater than a certain level, it can be assumed that this is a scene in which the occupant of the vehicle 100 desires a stronger feeling of acceleration above a certain level.

Especially, in the present embodiment, the determination of step S210 is performed assuming that the requested acceleration $a_{fr}$ exceeds the acceleration threshold $a_{th}$ (assuming that the determination result of step S is Yes). In other words, this determination is performed to specify a scene in which a possibility that the driver desires a strong feeling of acceleration is assumed to be higher. Therefore, the rate-of-change threshold $j_{th}$ is preferably set to a suitable value from the viewpoint of specifying the scene.

Then, if it is determined that the rate of change in requested acceleration $j_{fr}$ exceeds the rate-of-change threshold $j_{th}$, the controller 50 sets the exaggerated pitch rate $\omega_{\_c1}*$ (step S220). On the other hand, if it is determined that the rate of change in requested acceleration $j_{fr}$ is equal to or smaller than the rate-of-change threshold $j_{th}$, the controller 50 sets the suppressed pitch rate $\omega_{\_c2}*$ (step S230).

Figure 5B:
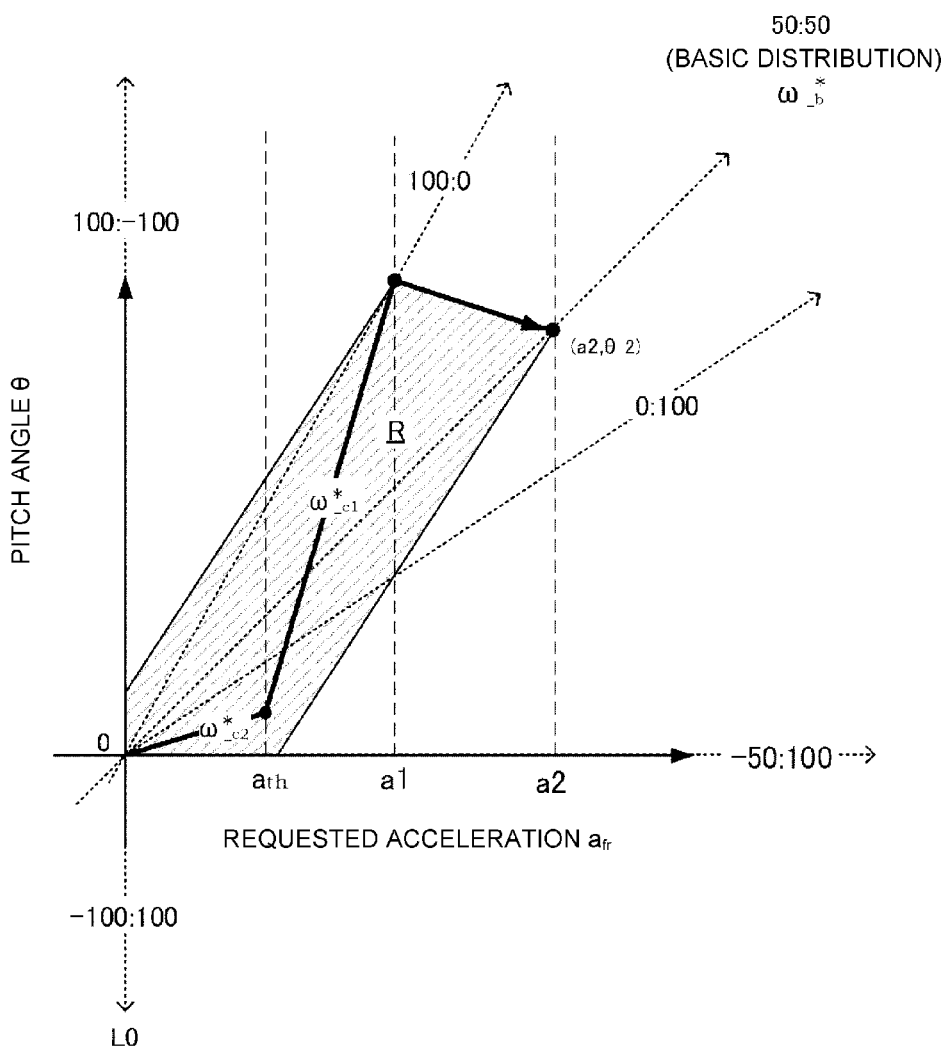
FIG. 5B is a map showing an example of operation points of the vehicle when a corrected pitch rate of the adjustment processing II is set.

FIG. 5B is a map showing an example of operation points of the vehicle 100 when the corrected pitch rate $\omega_{\_c}*$ of the adjustment processing II is set. Note that the map shown in FIG. 5B assumes that the rate of change in requested acceleration $j_{fr}$ exceeds the rate-of-change threshold $j_{th}$.

Also in the adjustment processing II, in the feasible region R, the suppressed pitch rate $\omega_{\_c2}*$ is set in the region where the requested acceleration $a_{fr}$ is equal to or lower than the acceleration threshold $a_{th}$, and the exaggerated pitch rate $\omega_{\_c1}*$ is set in the region where the requested acceleration $a_{fr}$ exceeds the acceleration threshold $a_{th}$. Especially, in the example shown in FIG. 5B, the exaggerated pitch rate $\omega_{\_c1}*$ based on the adjustment processing II is set to be greater than that based on the adjustment processing I.

By setting the corrected pitch rate $\omega_{\_c}*$ in this way, since the rate of change in requested acceleration $j_{fr}$ exceeds the rate-of-change threshold $j_{th}$, it is possible to enhance the feeling of acceleration given to the driver, especially in a scene in which the occupant is presumed to desire a strong feeling of acceleration.

Especially, the exaggerated pitch rate $\omega_{\_c1}*$ is preferably set to a larger value as the rate of change in requested acceleration $j_{fr}$ increases. As a result, it is possible to increase a pitch force in the nose-up direction that causes the feeling of acceleration in accordance to the intensity of the feeling of acceleration that is presumed to be desired by the driver.

Note that as in the adjustment processing I, the corrected pitch rate $\omega_{\_c}*$ in the adjustment processing II is also preferably set so that the pitch angle θ at the maximum value $a_2$ of the requested acceleration $a_{fr}$ becomes the same value θ2 as the basic pitch angle $θ_{\_b}*$ based on the basic pitch rate $\omega_{\_b}*$. To satisfy this requirement, as shown in FIG. 5B, it is preferable to set the corrected pitch rate $\omega_{\_c}*$ to a negative value (corresponding to a straight line with a negative slope in FIG. 5B) in the region where the requested acceleration $a_{fr}$ is equal to or higher than the predetermined value a1.

Furthermore, in the adjustment processing II, it is also preferable to set the suppressed pitch rate $\omega_{\_c2}*$ so that the front wheel driving force $F_f$ is negative and the rear wheel driving force $F_r$ is positive (so as to have a slope smaller than the line with a distribution ratio κ of 0:100), and to set the exaggerated pitch rate $\omega_{\_c1}*$ so that the front wheel driving force $F_f$ and the rear wheel driving force $F_r$ are positive (so as to have especially a slope between the line with the basic distribution ratio of 50:50 and the line with a distribution ratio of 100:0). As a result, while achieving smooth acceleration with the pitch displacement reduced as described above, by keeping a section in which the directions of the front wheel driving force $F_f$ and the rear wheel driving force $F_r$ are different from each other below the acceleration threshold $a_{th}$, deterioration of electricity consumption is also suppressed.

(Adjustment Processing III)

FIG. 4C is a flowchart explaining the adjustment processing III. In the adjustment processing III, steps S300 to S320 are executed.

In step S300, the controller 50 determines whether the rate of change in requested acceleration $j_{fr}$ exceeds the rate-of-change threshold $j_{th}$, as in step S210 in the adjustment processing II.

Then, if it is determined that the rate of change in requested acceleration $j_{fr}$ exceeds the rate-of-change threshold $j_{th}$, the controller 50 sets the exaggerated pitch rate $\omega_{\_c1}*$ (step S310). On the other hand, if it is determined that the rate of change in requested acceleration $j_{fr}$ is equal to or smaller than the rate-of-change threshold $j_{th}$, the controller 50 sets the basic pitch rate $\omega_{\_b}*$ (step S320).

Figure 5C:
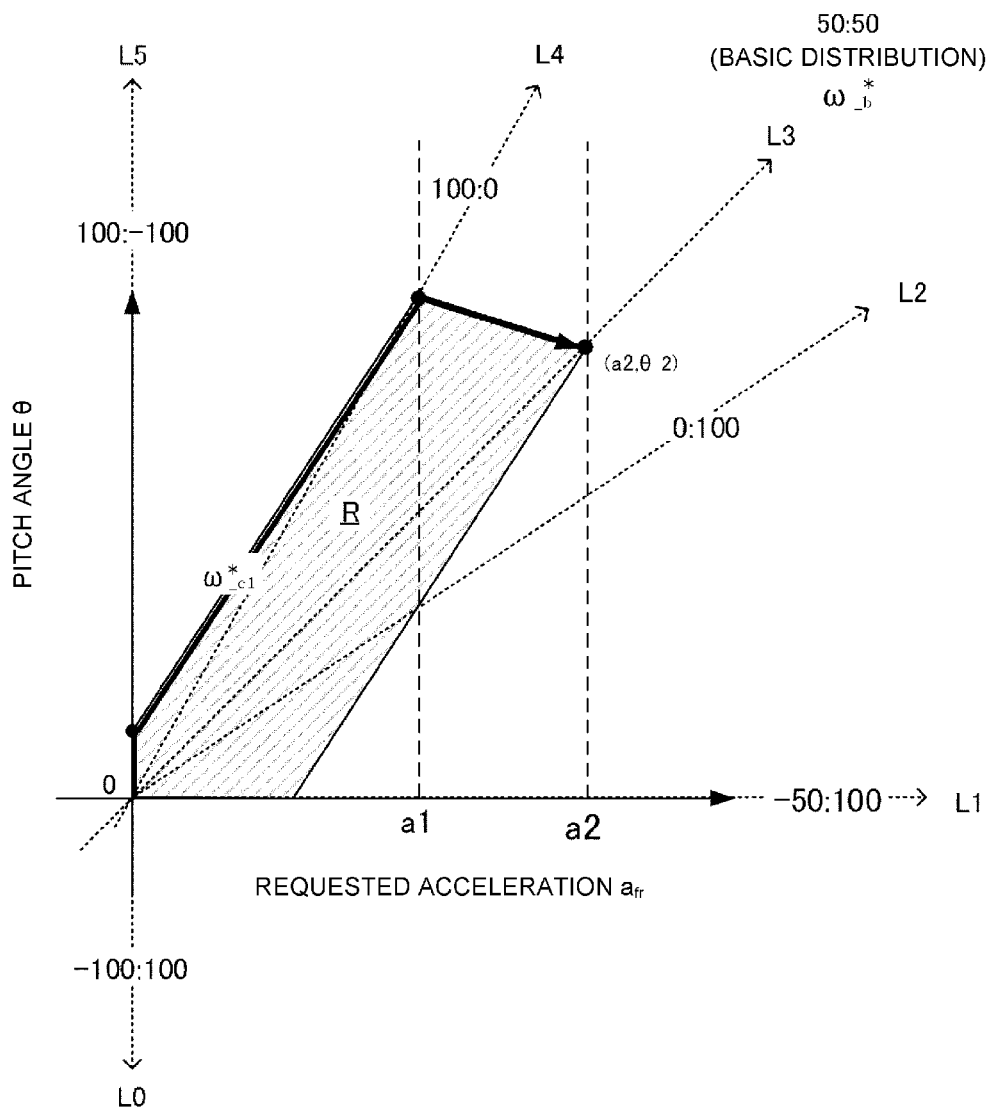
FIG. 5C is a map showing an example of operation points of the vehicle when a corrected pitch rate of the adjustment processing III is set.

FIG. 5C is a map showing an example of operation points of the vehicle 100 when the corrected pitch rate $\omega_{\_c}*$ of the adjustment processing III is set.

As can be seen from FIG. 5C, in the adjustment processing III, the exaggerated pitch rate $\omega_{\_c1}*$ is set in the entire region where the rate of change in requested acceleration $j_{fr}$ exceeds the rate-of-change threshold $j_{th}$ (that is, an entire acceleration region shown in FIG. 5C) regardless of the magnitude of the requested acceleration $a_{fr}$.

By setting the corrected pitch rate $\omega_{\_c}*$ in this way, especially in the scene in which the occupant is presumed to desire a strong feeling of acceleration, it is possible to make the occupant more strongly aware of the pitch motion and exaggerate the feeling of acceleration felt by the occupant.

Especially, the exaggerated pitch rate $\omega_{\_c1}*$ is preferably set to a larger value as the rate of change in requested acceleration $j_{fr}$ increases. As a result, it is possible to increase a pitch force in the nose-up direction that causes the feeling of acceleration in accordance to the intensity of the feeling of acceleration that is presumed to be desired by the driver.

Note that the corrected pitch rate $\omega_{\_c}*$ in the adjustment processing III is also preferably set to have the same value $\theta 2$ as the basic pitch angle $\theta_{\_b}*$ based on the basic pitch rate $\omega_{\_b}*$. To satisfy this requirement, it is preferable to set the corrected pitch rate $\omega_{\_c}*$ to a negative value (corresponding to a straight line with a negative slope in FIG. 5C) in the region where the requested acceleration $a_{fr}$ is equal to or higher than the predetermined value a1.

Figure 6:
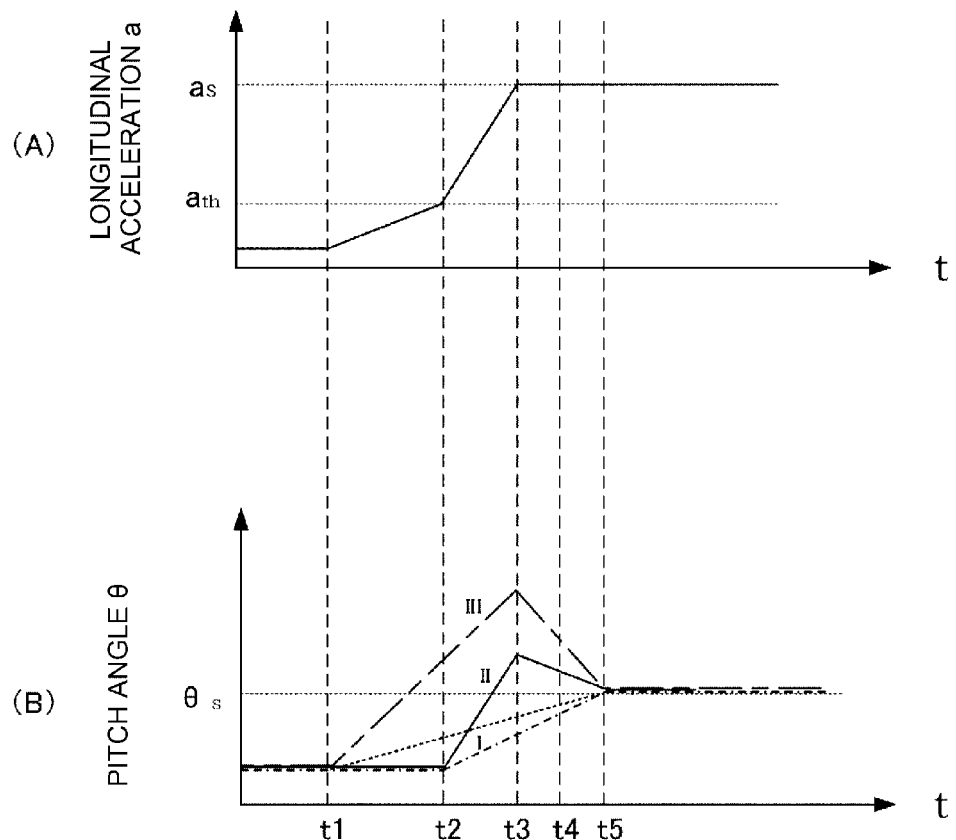
FIG. 6 is a time chart showing a control result by the driving force control method of a first embodiment.

Next, with reference to a time chart of FIG. 6, an example of control results when each of the adjustment processing I to III is executed will be described. The time chart of FIG. 6 assumes a change in the pitch angle $\theta$ from the longitudinal acceleration a being 0 (during starting of the vehicle 100) until reaching a predetermined constant value as in each of the adjustment processing I to III.

Especially, FIG. 6(A) shows a change over time in the longitudinal acceleration a, and FIG. 6(B) shows a change over time in the pitch angle $\theta$. In FIG. 6(B), the change over time in the pitch angle $\theta$ when the adjustment processing I is executed is indicated by a one-dot two-chain line, and the change over time in the pitch angle $\theta$ when the adjustment processing II is executed is indicated by a solid line, and the change over time in the pitch angle $\theta$ when the adjustment processing III is executed is shown by a dashed line. Note that for reference, a change over time in the pitch angle $\theta$ when none of the adjustment processing I to III are executed (when the basic pitch rate $\omega_{\_b}*$ is set) is indicated by a dotted line.

First, as described above, according to the control of the adjustment processing I, from the start of the vehicle 100 when the longitudinal acceleration a is 0 (timing t1) to the timing when the longitudinal acceleration a reaches the acceleration threshold $a_{th}$ (timing t2), the pitch rate $\omega$ is constrained relative to the basic pitch rate $\omega_{\_b}*$ (No in step S100 and step S120). Note that in the example shown in FIG. 6, the suppressed pitch rate $\omega_{\_c2}*$ set in the region equal to or lower than the acceleration threshold $a_{th}$ is set to 0.

Furthermore, in the adjustment processing I, in a transient state of the longitudinal acceleration a, that is, from the timing when the longitudinal acceleration a reaches the acceleration threshold $a_{th}$ (timing t2) to the timing when a predetermined period of time elapses after reaching the constant value as (timing t5), the pitch rate $\omega$ becomes greater than the basic pitch rate $\omega_{\_b}*$ (Yes in step S100 and step S110).

Next, in the adjustment processing II, the pitch rate $\omega$ is adjusted to 0 from the timing t1 to the timing t2, as in adjustment processing I (No in step S200 and step S230). On the other hand, if it is detected at the timing t2 that the longitudinal acceleration a exceeds the acceleration threshold $a_{th}$ and the rate of change in requested acceleration $j_{fr}$ exceeds a certain level, the pitch rate $\omega$ becomes greater than the basic pitch rate $\omega_\_b*$ (Yes in step S200, Yes in step S210, and step S220).

Note that in the adjustment processing II, after a timing t3 when the longitudinal acceleration a reaches the constant value as, a negative pitch rate $\omega$ is set to reduce the pitch angle $\theta$ to a predetermined constant value $\theta_s$.

In the adjustment processing III, if it is detected at the timing t1 that the rate of change in requested acceleration $j_{fr}$ becomes greater than a certain level, the pitch rate $\omega$ becomes greater than the basic pitch rate $\omega_{\_b}*$ (Yes in step S300 and Yes in step S310).

Note that in the adjustment processing III, after the timing t3 when the longitudinal acceleration a reaches the constant value as, a negative pitch rate $\omega$ is set to reduce the pitch angle $\theta$ to a predetermined constant value $\theta_s$.

Hereinafter, effects achieved by the configuration of the present embodiment described above will be described in more detail.

According to the present embodiment, provided is a driving force control method for controlling the driving force distribution ($F_f$, $F_r$) to each of the front wheel motor 10f serving as a first driving source connected to the front wheels 11f and the rear wheel motor 10r serving as a second driving source connected to the rear wheels 11r so that the pitch angle $\theta$ of the vehicle 100 behaves as desired. In this driving force control method, the pitch rate $\omega$ during starting of the vehicle 100 is set to the corrected pitch rate $\omega_{\_c}*$ different from the predetermined basic pitch rate $\omega_{\_b}*$. Especially, the basic pitch rate $\omega_{\_b}*$ is determined according to the basic driving force distribution (basic front wheel driving force $F_{f\_b}$ and basic rear wheel driving force $F_{r\_b}$) for achieving desired vehicle characteristics. The corrected pitch rate $\omega_{\_c}*$ is determined from the viewpoint of adjusting the feeling of acceleration of the occupant of the vehicle 100 according to the change in the requested acceleration $a_{fr}$ of the vehicle 100.

As a result, based on the pitch rate $\omega$ that achieves the desired intensity of the feeling of acceleration of the occupant according to the magnitude of the requested acceleration $a_{fr}$, the driving force distribution to the front and rear side of the vehicle 100 can be adjusted. Therefore, a control logic that gives the occupant a suitable feeling of acceleration in driving scenes is achieved.

In the present embodiment, the corrected pitch rate $\omega_{\_c}*$ includes the suppressed pitch rate $\omega_{\_c2}*$ that is smaller than the basic pitch rate $\omega_{\_b}*$ and the exaggerated pitch rate $\omega_{\_c1}*$ that is greater than the basic pitch rate $\omega_{\_b}*$. The suppressed pitch rate $\omega_{\_c2}*$ is set when the requested acceleration $a_{fr}$ is equal to or lower than a first threshold (the acceleration threshold $a_{th}$), and the exaggerated pitch rate $\omega_{\_c1}*$ is set when the requested acceleration $a_{fr}$ exceeds the acceleration threshold $a_{th}$ (FIG. 4A or FIG. 4B).

As a result, a scene (particularly in a high acceleration region) in which the occupant desires a strong feeling of acceleration during starting of the vehicle 100 is suitably detected, and a control logic that makes it possible to give the occupant a stronger feeling of acceleration in the scene is achieved.

Note that in the present embodiment, the logic for determining the scene in which the occupant desires a strong feeling of acceleration based on the magnitude relation between the requested acceleration $a_{fr}$ and the acceleration threshold $a_{th}$ as the first threshold has been described. On the other hand, instead of the above logic, a configuration may be adopted in which the scene is determined based on a magnitude relation between the rate of change in requested acceleration $j_{fr}$ and a value corresponding to the first threshold.

Furthermore, in the present embodiment (especially in the adjustment processing II), the suppressed pitch rate $\omega_{\_c2}*$ is set when the rate of change in requested acceleration $j_{fr}$ is equal to or smaller than a second threshold (the rate-of-change threshold $j_{th}$), and the exaggerated pitch rate $\omega_{\_c1}*$ is set when the rate of change in requested acceleration $j_{fr}$ exceeds the rate-of-change threshold $j_{th}$ (FIG. 4B).

As a result, the pitch rate ω can be further increased in the scene in which the rate of change in requested acceleration $j_{fr}$ is large and the occupant desires a particularly strong feeling of acceleration. In other words, a control logic that makes it possible to give the occupant a stronger feeling of acceleration in that scene is achieved.

In the present embodiment, it is preferable to increase the exaggerated pitch rate $ω_{\_c1}*$ as the requested acceleration $a_{fr}$ or the rate of change in requested acceleration $j_{fr}$ increases. As a result, it is possible to adjust the pitch rate ω so as to achieve the intensity of the feeling of acceleration desired by the occupant.

In the present embodiment (especially in the adjustment processing III), the exaggerated pitch rate $ω_{\_c1}*$ is set when the rate of change in requested acceleration $j_{fr}$ is equal to or smaller than a third threshold (the rate-of-change threshold $j_{th}$), and the suppressed pitch rate $ω_{\_c2}*$ is set when the rate of change in requested acceleration $j_{fr}$ exceeds the rate-of-change threshold $j_{th}$ (FIG. 4C). Here, the rate-of-change threshold $j_{th}$ is determined from the viewpoint of determining whether the requested acceleration $a_{fr}$ is large enough to the extent that the occupant desires a feeling of acceleration above a certain level.

As a result, for example, in a scene in which the driver depresses the accelerator pedal strongly or the like, the pitch rate ω can be quickly made higher than the basic pitch rate $ω_{\_b}*$. Therefore, it is possible to make the occupant and the driver more strongly recognize the pitch motion of the vehicle 100 and exaggerate the feeling of acceleration.

Note that the rate-of-change threshold $j_{th}$ (second threshold) in the adjustment processing II and the rate-of-change threshold $j_{th}$ (third threshold) in the adjustment processing III may be the same value or may be different values.

Furthermore, in the present embodiment, the controller 50 serving as a driving force control device for executing the driving force control method is provided.

Especially, the controller 50 functions as a driving force control device for controlling the driving force distribution $(F_f, F_r)$ to each of the front wheel motor 10f serving as the first driving source connected to the front wheels 1 if and the rear wheel motor 10r serving as the second driving source connected to the rear wheels 11r so that the pitch angle θ of the vehicle 100 behaves as desired. The controller 50 includes a setting unit (FIG. 2) that sets the pitch rate ω during starting of the vehicle 100 to the corrected pitch rate $ω_{\_c}*$ different from the predetermined basic pitch rate $ω_{\_b}*$. The setting unit determines the basic pitch rate ω_b* according to the basic driving force distribution (basic front wheel driving force $F_f b$ and basic rear wheel driving force $F_{r\_b}$) for achieving desired vehicle characteristics. The setting unit determines the corrected pitch rate $ω_{\_c}*$ from the viewpoint of adjusting the feeling of acceleration of the occupant of the vehicle 100 according to the change in the requested acceleration $a_{fr}$ of the vehicle 100.

As a result, a configuration of a control device suitable for executing the driving force control method is achieved.

Second Embodiment

Hereinafter, a second embodiment will be described. The same elements as those in the first embodiment are denoted by the same reference numerals, and the description thereof will be omitted. Especially, the present embodiment provides a different control mode related to the adjustment processing III.

Figure 7:
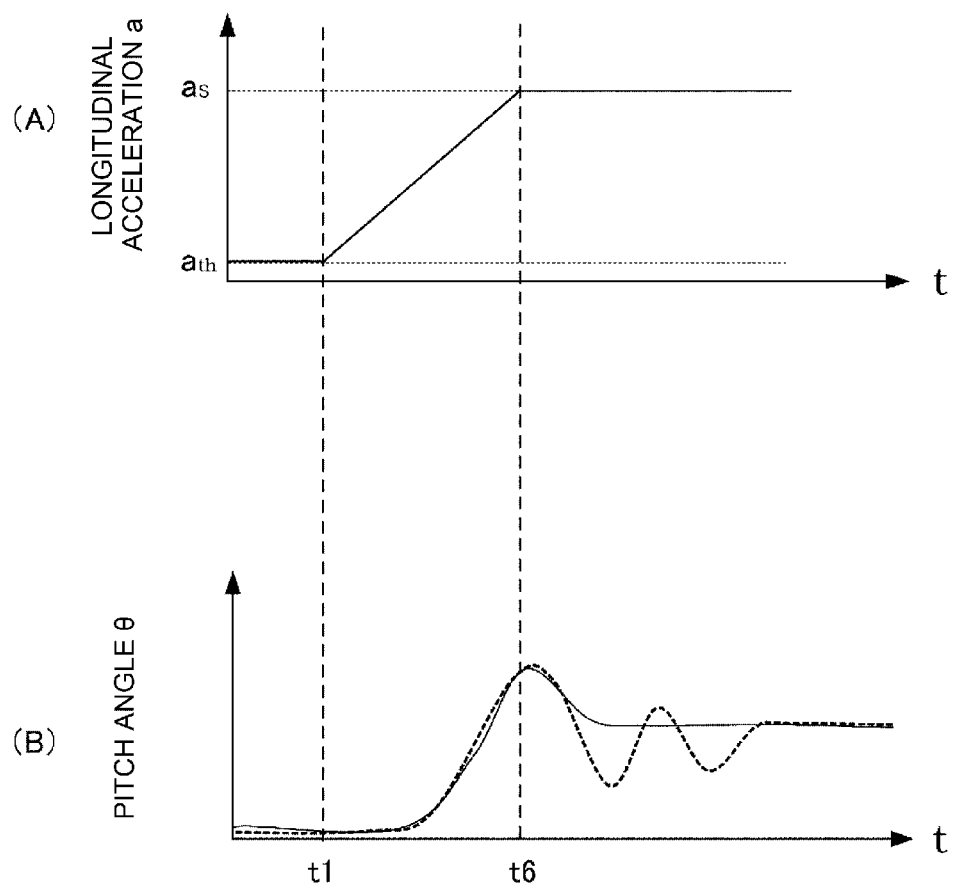
FIG. 7 is a time chart showing a control result by the adjustment processing III of a second embodiment.

FIG. 7 is a time chart showing a control result by the adjustment processing III of the present embodiment. As shown in the drawing, in the present embodiment, the exaggerated pitch rate $ω_{\_c1}*$ is set for a predetermined period of time from the timing (timing t1) when it is detected that the rate of change in requested acceleration $j_{fr}$ reaches the rate-of-change threshold $j_{th}$, and the pitch rate ω is set to 0 thereafter. Especially, the predetermined period of time is set as a period of time from the timing t1 when the exaggerated pitch rate $ω_{\_c1}*$ is set to a timing (timing t6) when a first peak of vibration of the pitch angle θ appears.

As a result, when the rate of change in requested acceleration $j_{fr}$ reaches the rate-of-change threshold $j_{th}$, the pitch rate ω can be increased to exaggerate the feeling of acceleration given to the occupant, while continuation of pitch vibration that causes discomfort to the occupant can also be suppressed.

Third Embodiment

Hereinafter, a third embodiment will be described. The same elements as those in the first or second embodiment are denoted by the same reference numerals, and the description thereof will be omitted.

In the present embodiment, under a condition that the corrected pitch rate $ω_{\_c}*$ is set based on any of the adjustment processing I to III, a control mode for changing the pitch rate ω according to various conditions is further provided.

Figure 8:
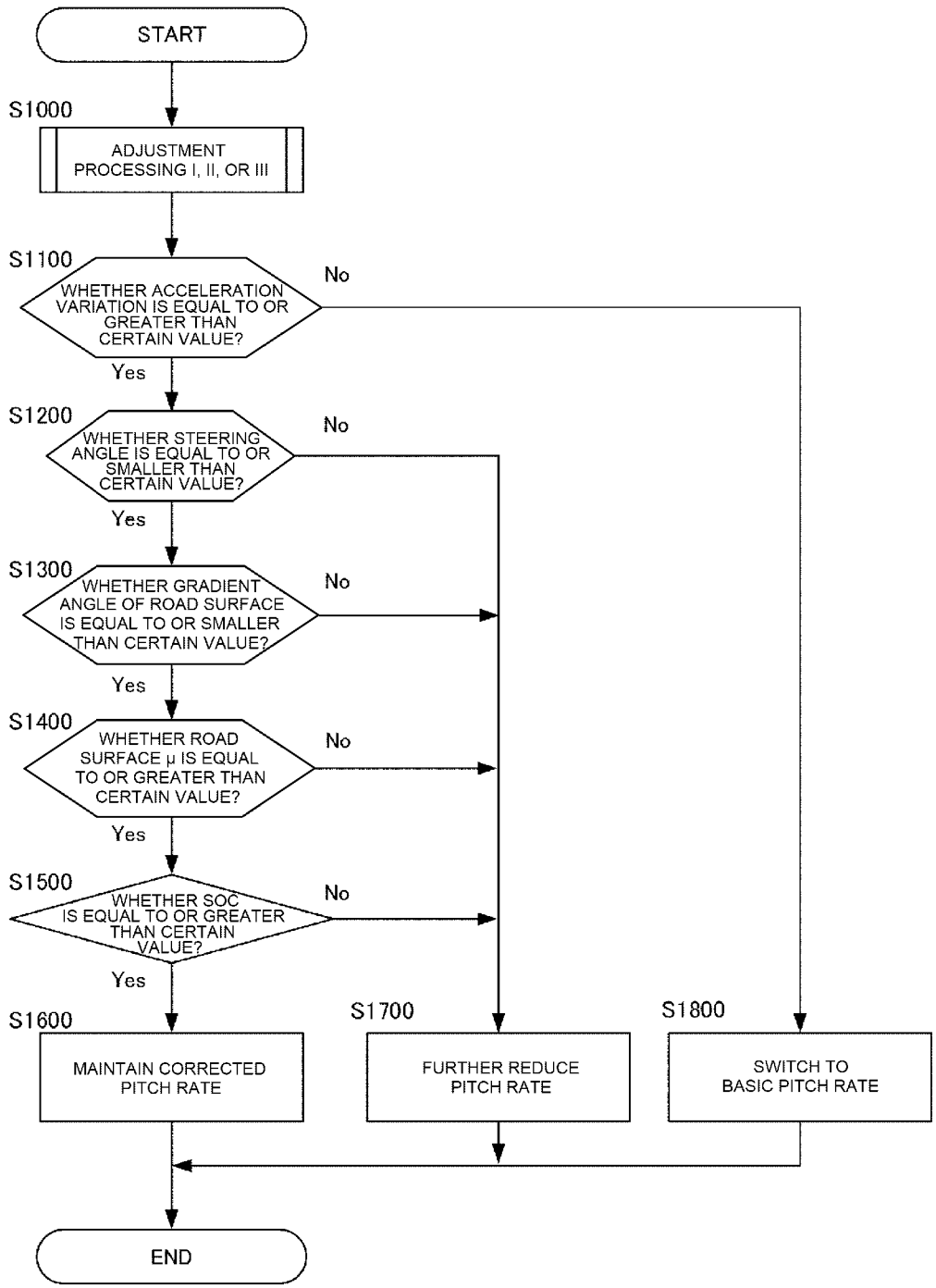
FIG. 8 is a flowchart explaining a driving force control method of a third embodiment.

FIG. 8 is a flowchart explaining a driving force control method of the present embodiment.

As shown in the drawing, assuming control of any of the adjustment processing I to III (Step S1000), the controller 50 of the present embodiment determines whether an acceleration variation (a rate of change in the longitudinal acceleration a) is equal to or greater than a certain value (step S1100), determines whether a steering angle of the vehicle 100 is equal to or smaller than a certain value (step S1200), determines whether a gradient angle is equal to or smaller than a certain value (step S1300), determines whether a road surface μ is equal to or greater than a certain value (step S1400), and determines whether the SOC of the battery is equal to or smaller than a certain value (step S1500).

Then, if the determination result of step S1100 is Yes, the controller 50 executes the processing after step S1200. On the other hand, if the determination result in step S1100 is No, the pitch rate ω is switched from the corrected pitch rate $ω_{\_c}*$ to the basic pitch rate $ω_{\_b}*$ (step S1800).

Furthermore, if all determination results of the determinations in steps S1200 to S1500 are Yes, the controller 50 maintains the corrected pitch rate $ω_{\_c}*$ determined by any one of the adjustment processing I to III (step S1600). On the other hand, if at least one of the determination results of these determinations is No, the controller 50 further decreases the corrected pitch rate $ω_{\_c}*$ (step S1700).

According to the control shown in FIG. 8 described above, when the acceleration variation is equal to or greater than a certain value (when the longitudinal acceleration a is in the transient state), the controller 50 sets the corrected pitch rate $ω_{\_c}*$ as it is. When the acceleration variation is less than the certain value (when the longitudinal acceleration a reaches the constant value as), the controller 50 switches a target value of the pitch rate ω from the corrected pitch rate $ω_{\_c}*$ to a basic pitch rate $ω_b$.

As a result, when the longitudinal acceleration a reaches the constant value as during starting of the vehicle 100, while executing the pitch rate ω control that prioritizes the feeling of acceleration given to the occupant, after the longitudinal acceleration a reaches the constant value as, it is possible to quickly switch to the pitch rate ω control that prioritizes exhibiting suitable vehicle characteristics. Especially in this case, it is preferable to control a speed at which the pitch rate ω is changed from the corrected pitch rate $\omega_{\_c}^*$ to the basic pitch rate $\omega_b$ so as to make it difficult for the driver to notice the pitch change (for example, so as to make the pitch direction acceleration less than 0.02 G).

The controller 50 sets the corrected pitch rate $\omega_{\_c}^*$ as it is when the steering angle is equal to or less than a certain value. On the other hand, when the steering angle exceeds a certain value, the controller 50 further decreases the pitch rate ω relative to the corrected pitch rate $\omega_{\_c}^*$ as the steering angle increases.

As a result, when the vehicle 100 turns with a large steering angle, it is possible to avoid so-called oversteer or understeer by suppressing the pitch displacement according to the magnitude of the steering angle (degree of turning).

Furthermore, the controller 50 sets the corrected pitch rate $\omega_{\_c}^*$ as it is when the gradient angle of the traveling path is equal to or less than a certain value. On the other hand, when the gradient angle exceeds a certain value, the controller 50 further decreases the pitch rate ω relative to the corrected pitch rate $\omega_{\_c}^*$ as the gradient angle increases.

As a result, in a scene in which the vehicle 100 is traveling on an uphill road, the pitch displacement is suppressed according to the magnitude of the gradient angle (a degree of inclination of the uphill road), so that the vehicle 100 is prevented from advancing or retreating unintentionally due to the gradient.

The controller 50 sets the corrected pitch rate $\omega_{\_c}^*$ as it is when the friction (road surface μ) of the traveling path is equal to or greater than a certain value. On the other hand, when the road surface μ is less than a certain value, the pitch rate ω is further reduced with respect to the corrected pitch rate $\omega_{\_c}^*$ as the road surface μ is smaller.

As a result, in a scene in which the vehicle 100 is traveling on a slippery road surface, it is possible to prevent the vehicle 100 from slipping by suppressing the pitch displacement according to the slipperiness of the road surface.

Furthermore, the controller 50 sets the corrected pitch rate $\omega_{\_c}^*$ as it is when SOC suggesting the remaining amount of charge of the vehicle battery is equal to or greater than a certain value. On the other hand, when SOC is less than a certain value, the pitch rate ω is further reduced with respect to the corrected pitch rate $\omega_{\_c}^*$ as SOC is greater.

As a result, in a scene in which SOC is insufficient, the pitch control amount can be suppressed according to the amount of the SOC shortage, thereby further improving the electricity consumption.

Figure 9:
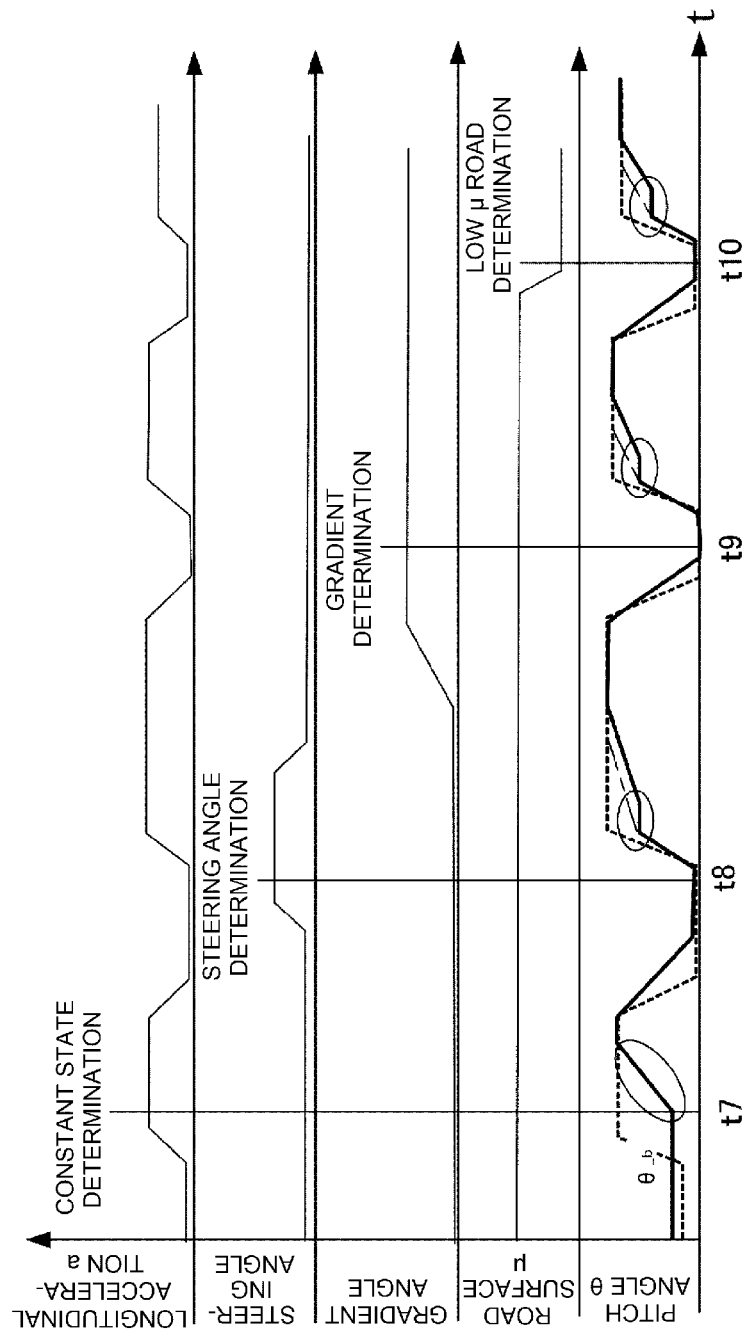
FIG. 9 is a time chart showing an example of a control result when the control of the third embodiment is applied.

FIG. 9 is a time chart showing an example of a control result when the control of the present embodiment is applied. Note that in FIG. 9, for reference, changes over time of the pitch angle θ when the corrected pitch rate $\omega_{\_c}^*$ and the basic pitch rate $\omega_{\_b}^*$ are applied are partially indicated by a dotted line and a dashed line, respectively.

As shown in the drawing, when it is detected that the acceleration variation becomes constant (timing t7), the pitch rate ω changes so that the pitch angle θ approaches the basic pitch angle $\theta_{\_b}^*$ (an encircled portion immediately after the timing t7). When it is detected that the steering angle of vehicle 100 is equal to or greater than a certain value (timing t8), the control amount of the pitch angle θ is reduced compared with when the corrected pitch rate $\omega_{\_c}^*$ is maintained (an encircled portion immediately after the timing t8). When it is detected that the gradient angle of vehicle 100 is equal to or greater than a certain value (timing t9), the control amount of the pitch angle θ is reduced compared with when the corrected pitch rate $\omega_{\_c}^*$ is maintained (an encircled portion immediately after the timing t9). When it is detected that the road surface μ is less than a certain value (timing t10), the control amount of the pitch angle θ is reduced compared with when the corrected pitch rate $\omega_{\_c}^*$ is maintained (an encircled portion immediately after the timing t10).

Note that in the present embodiment, a configuration in which the controller 50 executes all the determinations in steps S1100 to S1500 has been described. However, a mode in which the controller 50 executes only one or a plurality of the determinations in steps S1100 to S1500, and executes at least one of steps S1600 to S1800 according to the determination results is also within the scope of disclosure of this description.

Fourth Embodiment

Hereinafter, a fourth embodiment will be described. The same elements as those in the first to third embodiments are denoted by the same reference numerals, and the description thereof will be omitted.

Figure 10:
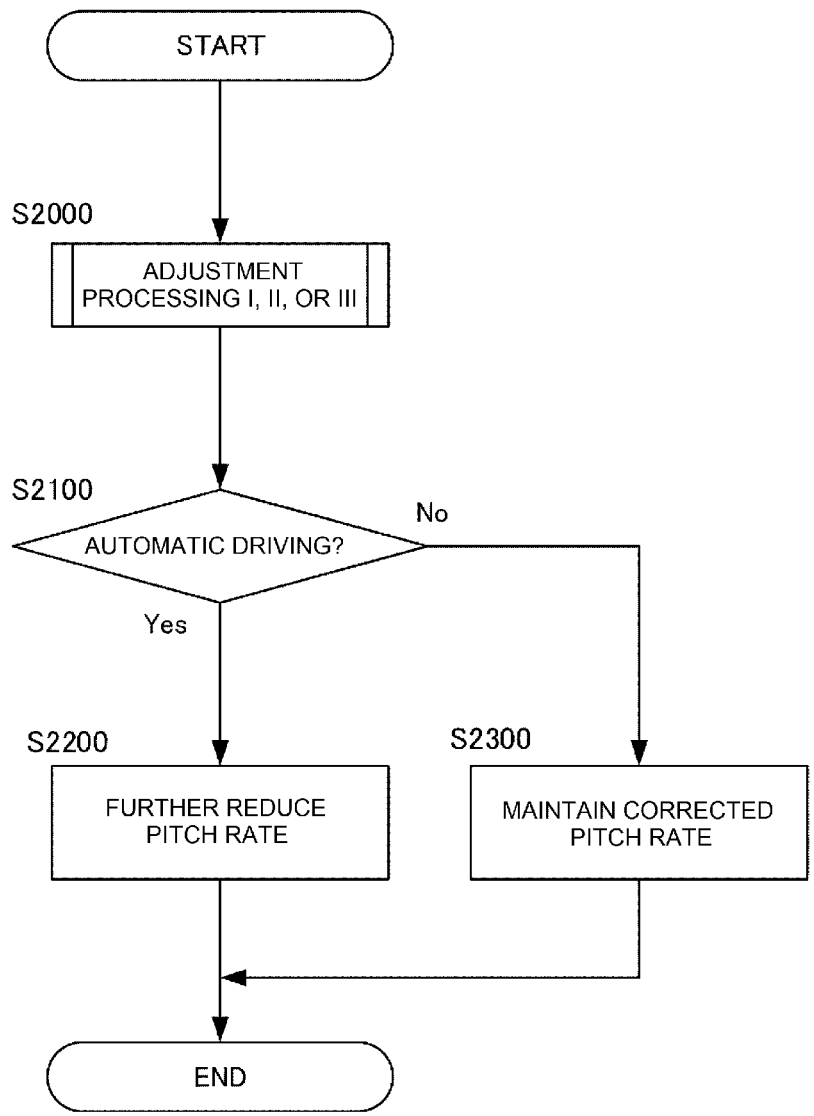
FIG. 10 is a flowchart explaining a driving force control method of a fourth embodiment.

FIG. 10 is a flowchart explaining a driving force control method of the present embodiment.

As shown in the drawing, assuming control of any of the adjustment processing I to III (Step S2000), the controller 50 further reduces the pitch rate ω (steps S2200 and S2300) when the vehicle 100 is operated by automatic driving (Yes in step S2100) as compared with a case where the vehicle 100 is operated by manual driving by the occupant (especially the driver) (No in step S2100).

As a result, since the driver himself or herself performs the accelerator operation, the manual driving operation is considered to have a higher correlation between the magnitude of the requested acceleration $a_{fr}$ or the rate of change in requested acceleration $j_{fr}$ and the probability that the driver desires a strong feeling of acceleration, and therefore, the pitch rate CJ control can be executed with higher priority given to the feeling of acceleration given to the occupant. On the other hand, in the automatic driving in which the requested acceleration $a_{fr}$ or the rate of change in requested acceleration $j_{fr}$ does not depend on the direct operation by the driver, it is possible to give priority to exhibiting suitable vehicle characteristics and suppress the pitch displacement.

Although the embodiments of the present invention have been described above, the above embodiments merely exemplify some of application examples of the present invention and do not intend to limit the technical scope of the present invention to the specific configurations of the above embodiments.

Furthermore, the above embodiments can be combined as appropriate.

The invention claimed is:

1. A driving force control method for controlling driving force distribution to each of a first driving source connected to front wheels and a second driving source connected to rear wheels so that a pitch angle of a vehicle behaves as desired, the method comprising:

calculating a first basic driving force ($F_{f\_b}$) and a second basic driving force ($F_{r\_b}$), respectively from a total requested driving force ($F_{fr}$) and a basic distribution ratio ($\kappa_b$) for achieving desired vehicle characteristics, the first basic driving force ($F_{f\_b}$) being a basic value of a driving force of the first driving source (10*f*),
the second basic driving force ($F_{f\_r}$) being the basic value of the driving force of the second driving source (10*r*), calculating a first corrected driving force ($F_{f\_c}$) and a second corrected driving force ($F_{r\_c}$), respectively from a requested acceleration ($a_{fr}$) or a rate of change of the requested acceleration ($j_{fr}$) of the vehicle (100), the first basic driving force ($F_{f\_b}$), and the second basic driving force ($F_{f\_r}$), the first corrected driving force ($F_{f\_c}$) and the second corrected driving force ($F_{r\_c}$) causing a pitch rate ($\omega$) of the vehicle to become a corrected pitch rate ($\omega_{\_c}^*$), the corrected pitch rate ($\omega_{\_c}^*$) being different from a basic pitch rate ($\omega_{\_b}^*$) during acceleration of the vehicle, the basic pitch rate ($\omega_{\_b}^*$) being determined based on the basic distribution ratio ($\kappa_b$), and driving the first driving source (10f) and the second driving source (10r), respectively based on the first corrected driving force ($F_{f\_c}$) and the second corrected driving force ($F_{r\_c}$);

the corrected pitch rate is set to a suppressed pitch rate ($\omega_{\_c2}^*$) smaller than the basic pitch rate ($\omega_{\_b}^*$) when a requested acceleration or a rate of change of the requested acceleration of the vehicle is equal to or less than a predetermined first threshold, and is set to an exaggerated pitch rate ($\omega_{\_c1}^*$) larger than the basic pitch rate ($\omega_{\_b}^*$) when the requested acceleration or the rate of change of the requested acceleration exceeds the first threshold.

2. The driving force control method according to claim 1, further comprising:

setting to the suppressed pitch rate when the rate of change of the requested acceleration is equal to or less than a predetermined second threshold; and setting to the exaggerated pitch rate when the rate of change of the requested acceleration exceeds the second threshold.

3. The driving force control method according to claim 1, further comprising:

increasing the exaggerated pitch rate as the requested acceleration or the rate of change of the requested acceleration increases.

4. The driving force control method according to claim 1, further comprising:

when it is determined that a change in a longitudinal acceleration of the vehicle is equal to or less than a certain value, switching the corrected pitch rate to the basic pitch rate.

5. The driving force control method according to claim 1, further comprising:

decreasing the corrected pitch rate as a steering angle of the vehicle increases, or a gradient angle of a traveling path of the vehicle increases, or a friction of the traveling path of the vehicle decreases, or a remaining amount of charge of a battery mounted on the vehicle decreases.

6. The driving force control method according to claim 1, further comprising:

setting the pitch rate to the corrected pitch rate when the vehicle is operated by manual driving operation; and when the vehicle is operated by automatic driving, reducing the pitch rate more than when the vehicle is operated by manual driving operation.

7. A driving force control method for controlling driving force distribution to each of a first driving source connected to front wheels and a second driving source connected to rear wheels so that a pitch angle of a vehicle behaves as desired, the method comprising:

calculating a first basic driving force ($F_{f\_b}$) and a second basic driving force ($F_{r\_b}$), respectively from a total requested driving force ($F_{fr}$) and a basic distribution ratio ($\kappa_b$) for achieving desired vehicle characteristics, the first basic driving force ($F_{f\_b}$) being a basic value of a driving force of the first driving source (10f), the second basic driving force ($F_{f\_r}$) being the basic value of the driving force of the second driving source (10r), calculating a first corrected driving force ($F_{f\_c}$) and a second corrected driving force ($F_{r\_c}$), respectively from a requested acceleration ($a_{fr}$) or a rate of change of the requested acceleration ($j_{fr}$) of the vehicle (100), the first basic driving force ($F_{f\_b}$), and the second basic driving force ($F_{f\_r}$), the first corrected driving force ($F_{f\_c}$) and the second corrected driving force ($F_{r\_c}$) causing a pitch rate ($\omega$) of the vehicle to become a corrected pitch rate ($\omega_{\_c}^*$), the corrected pitch rate ($\omega_{\_c}^*$) being different from a basic pitch rate ($\omega_{\_b}^*$) during acceleration of the vehicle, the basic pitch rate ($\omega_{\_b}^*$) being determined based on the basic distribution ratio ($\kappa_b$), and driving the first driving source (10f) and the second driving source (10r), respectively based on the first corrected driving force ($F_{f\_c}$) and the second corrected driving force ($F_{r\_c}$); wherein the corrected pitch rate is set to an exaggerated pitch rate ($\omega_{\_c1}^*$) larger than the basic pitch rate ($\omega_{\_b}^*$) when a rate of change of a requested acceleration of the vehicle is equal to or less than a predetermined threshold ($j_{th}$), and is set to a suppressed pitch rate ($\omega_{\_c2}^*$) smaller than the basic pitch rate ($\omega_{\_b}^*$) when the rate of change of the requested acceleration exceeds the threshold ($j_{th}$).

8. The driving force control method according to claim 7, further comprising:

setting the exaggerated pitch rate only for a predetermined period of time, and then setting the pitch rate to approximately 0.

9. A driving force control device for controlling driving force distribution to each of a first driving source connected to front wheels and a second driving source connected to rear wheels so that a pitch angle of a vehicle behaves as desired, the device is programmed to:

calculate a first basic driving force ($F_{f\_b}$) and a second basic driving force ($F_{r\_b}$), respectively from a total requested driving force ($F_{fr}$) and a basic distribution ratio ($\kappa_b$) for achieving desired vehicle characteristics, the first basic driving force ($F_{f\_b}$) being a basic value of a driving force of the first driving source (10f), the second basic driving force ($F_{f\_r}$) being the basic value of the driving force of the second driving source (10r), calculate a first corrected driving force ($F_{f\_c}$) and a second corrected driving force ($F_{r\_c}$), respectively from a requested acceleration ($a_{fr}$) or a rate of change of the requested acceleration ($j_{fr}$) of the vehicle (100), the first basic driving force ($F_{f\_b}$), and the second basic driving force ($F_{f\_r}$), the first corrected driving force ($F_{f\_c}$) and the second corrected driving force ($F_{r\_c}$) causing a pitch rate ($\omega$) of the vehicle to become a corrected pitch rate ($\omega_{\_c}^*$), the corrected pitch rate ($\omega_c{}^*$) being different from a basic pitch rate ($\omega_b{}^*$) during acceleration of the vehicle, the basic pitch rate ($\omega_b{}^*$) being determined based on the basic distribution ratio ($\kappa_b$), and drive the first driving source (10*f*) and the second driving source (10*r*), respectively based on the first corrected driving force ($F_{f\_c}$) and the second corrected driving force ($F_{r\_c}$);

wherein the device is further programmed to:

set the corrected pitch rate to a suppressed pitch rate smaller than the basic pitch rate when a requested acceleration or a rate of change of the requested acceleration of the vehicle is equal to or less than a predetermined first threshold, and set the corrected pitch rate to an exaggerated pitch rate greater than the basic pitch rate when the requested acceleration or the rate of change of the requested acceleration exceeds the first threshold.

10. A driving force control device for controlling driving force distribution to each of a first driving source connected to front wheels and a second driving source connected to rear wheels so that a pitch angle of a vehicle behaves as desired, the device is programmed to:

calculate a first basic driving force ($F_{f\_b}$) and a second basic driving force ($F_{r\_b}$), respectively from a total requested driving force ($F_{fr}$) and a basic distribution ratio ($\kappa_b$) for achieving desired vehicle characteristics, the first basic driving force ($F_{f\_b}$) being a basic value of a driving force of the first driving source (10*f*), the second basic driving force ($F_{r\_r}$) being the basic value of the driving force of the second driving source (10*r*), calculate a first corrected driving force ($F_{f\_c}$) and a second corrected driving force ($F_{r\_c}$), respectively from a requested acceleration ($a_{fr}$) or a rate of change of the requested acceleration ($j_{fr}$) of the vehicle (100), the first basic driving force ($F_{f\_b}$), and the second basic driving force ($F_{f\_r}$), the first corrected driving force ($F_{f\_c}$) and the second corrected driving force ($F_{r\_c}$) causing a pitch rate ($\omega$) of the vehicle to become a corrected pitch rate ($\omega_c{}^*$), the corrected pitch rate ($\omega_c{}^*$) being different from a basic pitch rate ($\omega_b{}^*$) during acceleration of the vehicle, the basic pitch rate ($\omega_b{}^*$) being determined based on the basic distribution ratio ($\kappa_b$), and drive the first driving source (10*f*) and the second driving source (10*r*), respectively based on the first corrected driving force ($F_{f\_c}$) and the second corrected driving force ($F_{r\_c}$);

wherein the device is further programmed to:

set the corrected pitch rate to an exaggerated pitch rate greater than the basic pitch rate when a rate of change of a requested acceleration of the vehicle is equal to or less than a predetermined threshold ($j_{th}$), and set the corrected pitch rate to a suppressed pitch rate smaller than the basic pitch rate when the rate of change of the requested acceleration exceeds the threshold ($j_{th}$).

\* \* \* \* \*